United States Patent
Yea et al.

(10) Patent No.: US 11,514,612 B2
(45) Date of Patent: Nov. 29, 2022

(54) METHOD AND APPARATUS FOR POINT CLOUD CODING

(71) Applicant: Tencent America LLC, Palo Alto, CA (US)

(72) Inventors: Sehoon Yea, Palo Alto, CA (US); Wen Gao, West Windsor, NJ (US); Xiang Zhang, Sunnyvale, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/203,155

(22) Filed: Mar. 16, 2021

(65) Prior Publication Data

US 2021/0312667 A1 Oct. 7, 2021

Related U.S. Application Data

(60) Provisional application No. 63/004,304, filed on Apr. 2, 2020.

(51) Int. Cl.
*G06T 9/00* (2006.01)
*G06T 17/00* (2006.01)
*H04N 19/96* (2014.01)
*H04N 19/184* (2014.01)
*H04N 19/167* (2014.01)
*H04N 19/103* (2014.01)

(52) U.S. Cl.
CPC .............. *G06T 9/00* (2013.01); *G06T 17/005* (2013.01); *H04N 19/103* (2014.11); *H04N 19/167* (2014.11); *H04N 19/184* (2014.11); *H04N 19/96* (2014.11); *G06T 2210/56* (2013.01)

(58) Field of Classification Search
CPC .. H04N 19/184; H04N 19/167; H04N 19/103; G06T 9/00
USPC ..................................................... 375/240.02
See application file for complete search history.

(56) References Cited

U.S. PATENT DOCUMENTS

| | | |
|---|---|---|
| 2017/0347122 A1 | 11/2017 | Cho et al. |
| 2019/0394496 A1 | 12/2019 | Tourapis et al. |
| 2021/0250618 A1 | 8/2021 | Zhang et al. |

FOREIGN PATENT DOCUMENTS

| | | |
|---|---|---|
| WO | WO 2019/011636 A1 | 1/2019 |
| WO | WO 2020/057530 A1 | 3/2020 |

OTHER PUBLICATIONS

International Search Report and Written Opinion dated Jun. 4, 2021 in PCT/US 21/24044.

(Continued)

*Primary Examiner* — On S Mung
(74) *Attorney, Agent, or Firm* — ArentFox Schiff LLP

(57) ABSTRACT

A method of point cloud geometry decoding in a point cloud decoder is provided. In the method, first signaling information is received from a coded bitstream for a point cloud that includes a set of points in a three-dimensional (3D) space. The first signaling information indicates partition information of the point cloud. Second signaling information is determined based on the first signaling information indicating a first value. The second signaling information is indicative of a partition mode of the set of points in the 3D space. Further, the partition mode of the set of points in the 3D space is determined based on the second signaling information. The point cloud is reconstructed subsequently based on the partition mode.

17 Claims, 16 Drawing Sheets

(56) References Cited

OTHER PUBLICATIONS

European Search Report dated Aug. 4, 2022 in Application No. 21779937.8, pp. 1-11.
Sehoon Yea et al: "[G-PCC] On explicit signaling of QtBt", 129. MPEG Meeting; 20200113-20200117 Brussels; (Motion Picture Expert Group or ISO/IEC JTC1/SC29/WG11), No. m52722, Jan. 14, 2020.
Kiang Zhang (Tencent) et al: "[G-PCC] CE13.22 report on implicit QTBT partition", 128. MPEG Meeting 20191007-20191011; Geneva; (Motion Picture Expert Group or ISO/IEC JTC1/SC29/WG11), No. m50921, Oct. 4, 2019.

METHOD AND APPARATUS FOR POINT CLOUD CODING

INCORPORATION BY REFERENCE

This present application claims the benefit of priority to U.S. Provisional Application No. 63/004,304, "METHOD AND APPARATUS FOR FLEXIBLE QUAD-TREE AND BINARY-TREE PARTITIONING FOR GEOMETRY CODING" filed on Apr. 2, 2020, which is incorporated by reference herein in its entirety.

TECHNICAL FIELD

The present disclosure describes embodiments generally related to point cloud coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. Point clouds can be used as a 3D representation of the world. A point cloud is a set of points in a 3D space, each with associated attributes, e.g. color, material properties, texture information, intensity attributes, reflectivity attributes, motion related attributes, modality attributes, and/or various other attributes. Such point clouds may include large amounts of data and may be costly and time-consuming to store and transmit.

SUMMARY

Aspects of the disclosure provide methods and apparatuses for point cloud compression and decompression. According to an aspect of the disclosure, a method of point cloud geometry decoding in a point cloud decoder is provided. In the method, first signaling information can be received from a coded bitstream for a point cloud that includes a set of points in a three-dimensional (3D) space. The first signaling information can indicate partition information of the point cloud. Second signaling information can be determined based on the first signaling information indicating a first value. The second signaling information can be indicative of a partition mode of the set of points in the 3D space. Further, the partition mode of the set of points in the 3D space can be determined based on the second signaling information. The point cloud can be reconstructed subsequently based on the partition mode.

In some embodiments, the partition mode can be determined to be a pre-defined Quad-tree and Binary-tree (QtBt) partition based on the second signaling information indicating a second value.

In the method, third signaling information can be received that indicates the 3D space is an asymmetric cuboid. Dimensions of the 3D space that are signaled along x, y, and z directions can be determined based on the third signaling information indicating the first value.

In some embodiments, 3-bit signaling information can be determined for each of a plurality of partition levels in the partition mode based on the second signaling information indicating the first value. The 3-bit signaling information for each of the plurality of partition levels can be indicative of partition directions along x, y, and z directions for the respective partition level in the partition mode.

In some embodiments, the 3-bit signaling information can be determined based on dimensions of the 3D space.

In the method, the partition mode can be determined based on the first signaling information indicating a second value, where the partition mode can include a respective octree-partition in each of a plurality of partition levels in the partition mode.

According to an aspect of the disclosure, a method of point cloud geometry decoding in a point cloud decoder is provided. In the method, first signaling information can be received from a coded bitstream for a point cloud that includes a set of points in a three-dimensional (3D) space. The first signaling information can be indicative of partition information of the point cloud. A partition mode of the set of points in the 3D space can be determined based on the first signaling information, where the partition mode can include a plurality of partition levels. The point cloud can subsequently be reconstructed based on the partition mode.

In some embodiments, 3-bit signaling information for each of the plurality of partition levels in the partition mode can be determined based on the first signaling information indicating a first value, where the 3-bit signaling information for each of the plurality of partition levels can be indicative of partition directions along x, y, and z directions for the respective partition level in the partition mode.

In some embodiments, the 3-bit signaling information can be determined based on dimensions of the 3D space.

In some embodiments, the partition mode can be determined to include a respective octree-partition in each of the plurality of partition levels in the partition mode based on the first signaling information indicating a second value.

In the method, second signaling information can further be received from the coded bitstream for the point cloud. The second signaling information can indicate the 3D space is an asymmetric cuboid when the second signaling information is a first value, and the 3D space is a symmetric cuboid when the second signaling information is a second value.

In some embodiments, based on the first signal information indicating the second value and the second signal information indicating the first value, the partition mode can be determined to include a respective octree-partition in each of first partition levels in the plurality of partition levels of the partition mode. A partition type and a partition direction of a last partition level of the plurality of partition levels of the partition mode can be determined according to conditions as follows:

| Partition type and direction | Qt along x-y axes | Qt along x-z axes | Qt along y-z axes |
|---|---|---|---|
| Condition | $d_z = 0 < d_x = d_y$ | $d_y = 0 < d_x = d_z$ | $d_x = 0 < d_y = d_z$ |
| Partition type and direction | Bt along x axis | Bt along y axis | Bt along z axis |
| Condition | $d_y = 0 \leq d_z < d_x$ $d_z = 0 \leq d_y < d_x$ | $d_x = 0 \leq d_z < d_y$ $d_z = 0 \leq d_x < d_y$ | $d_x = 0 \leq d_y < d_z$ $d_y = 0 \leq d_x < d_z$, | wherein the $d_x$, $d_y$, and $d_z$ are log2 sizes of the 3D space in the x, y, and z directions, respectively.

In the method, second signaling information can be determined based on the first signaling information indicating a first value. The second signaling information can indicate the 3D space is an asymmetric cuboid when the second signaling information indicates the first value, and the 3D space is a symmetric cuboid when the second signaling information indicates a second value. Further, dimensions of the 3D space that are signaled along x, y, and z directions can be determined based on the second signaling information indicating the first value.

In some examples, the apparatus for processing point cloud data includes receiving circuitry and processing circuitry that are configured to perform one or more of the methods described above.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Advanced 3D representations of the world are enabling more immersive forms of interaction and communication, and also allow machines to understand, interpret and navigate our world. 3D point clouds have emerged as an enabling representation of such information. A number of application cases associated with point cloud data have been identified, and corresponding requirements for point cloud representation and compression have been developed. For example, a 3D point cloud can be used in autonomous driving for object detection and localization. The 3D point cloud can be also used in geographic information systems (GIS) for mapping, and used in cultural heritage to visualize and archive cultural heritage objects and collections.

A point cloud generally may refer to a set of points in a 3D space, each with associated attributes. The attributes can include color, material properties, texture information, intensity attributes, reflectivity attributes, motion related attributes, modality attributes, and/or various other attributes. Point clouds can be used to reconstruct an object or a scene as a composition of such points. The points can be captured using multiple cameras, depth sensors and/or Lidar in various setups and may be made up of thousands up to billions of points in order to realistically represent reconstructed scenes.

Compression technologies can reduce the amount of data required to represent a point cloud for faster transmission or reduction of storage. As such, technologies are needed for lossy compression of point clouds for use in real-time communications and six Degrees of Freedom (6 DoF) virtual reality. In addition, technology is sought for lossless point cloud compression in the context of dynamic mapping for autonomous driving and cultural heritage applications, and the like. Thus, ISO/IEC MPEG (JTC 1/SC 29/WG 11) has started working on a standard to address compression of geometry and attributes such as colors and reflectance, scalable/progressive coding, coding of sequences of point clouds captured over time, and random access to subsets of the point cloud.

Figure 1:
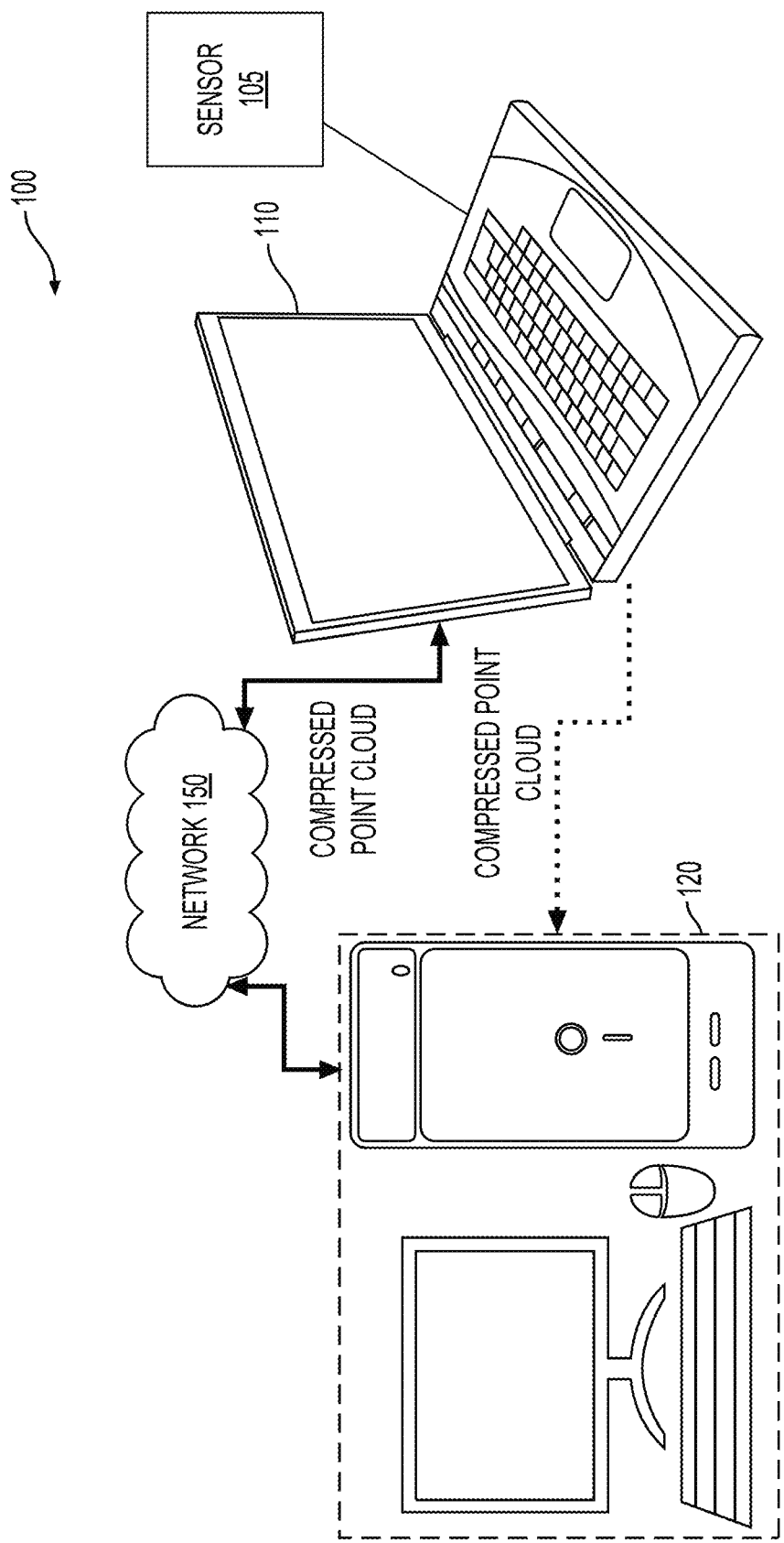
FIG. 1 is a schematic illustration of a simplified block diagram of a communication system in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) may perform unidirectional transmission of point cloud data. For example, the terminal device (110) may compress a point cloud (e.g., points representing a structure) that is captured by a sensor (105) connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud, and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number of networks that transmit a compressed point cloud between the terminal devices (110) and (120). The network (150) can include for example wireline (wired)

and/or wireless communication networks. The network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
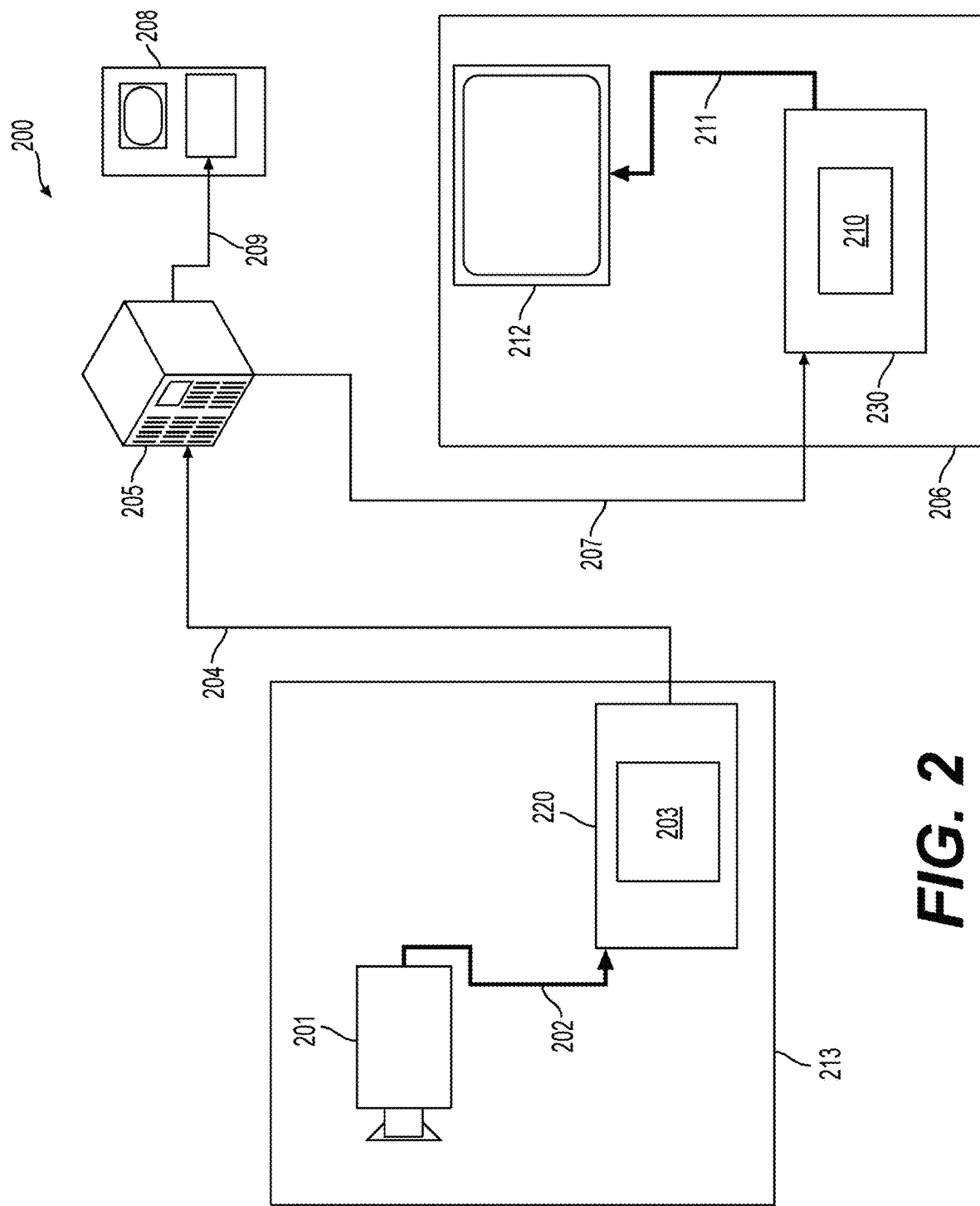
FIG. 2 is a schematic illustration of a simplified block diagram of a streaming system in accordance with an embodiment.

FIG. 2 illustrates a simplified block diagram of a streaming system (200) in accordance with an embodiment. The FIG. 2 example is an application for the disclosed subject matter for a point cloud. The disclosed subject matter can be equally applicable to other point cloud enabled applications, such as, a 3D telepresence application, virtual reality application, and the like.

The streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212).

It is noted that the electronic devices (220) and (230) can include other components (not shown). For example, the electronic device (220) can include a decoder (not shown) and the electronic device (230) can include an encoder (not shown) as well.

In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

Figure 3:
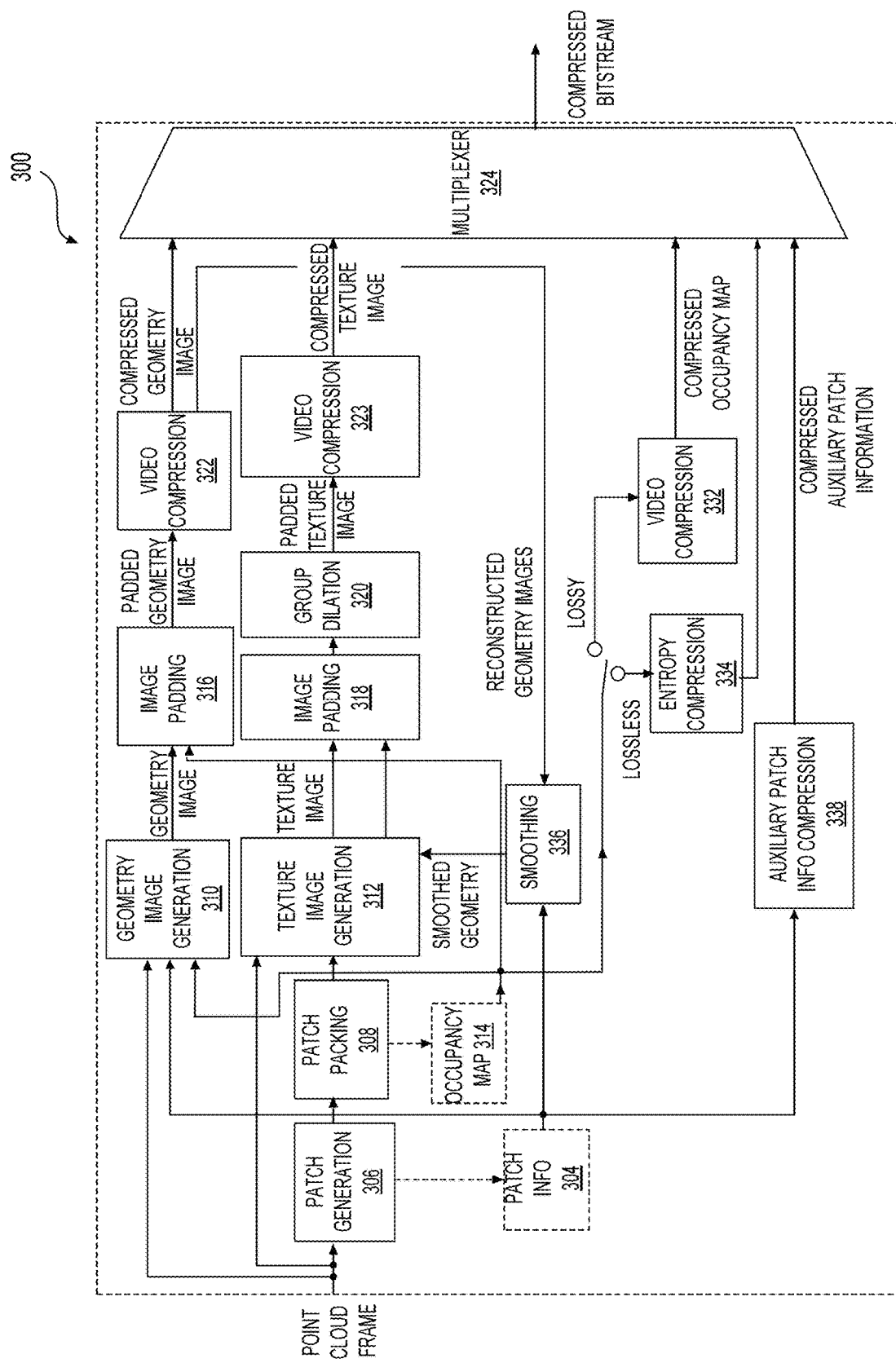
FIG. 3 shows a block diagram of an encoder for encoding point cloud frames, according to some embodiments.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames as uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334), and a multiplexer (324).

According to an aspect of the disclosure, the V-PCC encoder (300), converts 3D point cloud frames into an image-based representation along with some meta data (e.g., occupancy map and patch info) that is used to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels, and a pixel filled with a texture value can be referred to as a texture sample. An occupancy map is a 2D image with pixels filled with values that indicate occupied or unoccupied by patches.

A patch generally may refer to a contiguous subset of the surface described by the point cloud. In an example, a patch includes points with surface normal vectors that deviate from one another less than a threshold amount. The patch generation module (306) segments a point cloud into a set of patches, which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

The patch info module (304) can collect the patch information that indicates sizes and shapes of the patches. In some examples, the patch information can be packed into an image frame and then encoded by the auxiliary patch info compression module (338) to generate the compressed auxiliary patch information.

The patch packing module (308) is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, a geometry image is represented by a monochromatic frame of W×H in YUV420-8 bit format. To generate the texture image, the texture generation procedure exploits the reconstructed/smoothed geometry in order to compute the colors to be associated with the re-sampled points.

The occupancy map module (314) can generate an occupancy map that describes padding information at each unit. For example, the occupancy image includes a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map. When lossy coding is used, the video compression module (332) is used to compress the occupancy map.

It is noted that the patch packing module (308) may leave some empty spaces between 2D patches packed in an image frame. The image padding modules (316) and (318) can fill the empty spaces (referred to as padding) in order to generate an image frame that may be suited for 2D video and image codecs. The image padding is also referred to as background filling which can fill the unused space with redundant information. In some examples, a good background filling minimally increases the bit rate and does not introduce significant coding distortion around the patch boundaries.

The video compression modules (322), (323), and (332) can encode the 2D images, such as the padded geometry images, padded texture images, and occupancy maps based on a suitable video coding standard, such as HEVC, VVC and the like. In an example, the video compression modules (322), (323), and (332) are individual components that operate separately. It is noted that the video compression modules (322), (323), and (332) can be implemented as a single component in another example.

In some examples, the smoothing module (336) is configured to generate a smoothed image of the reconstructed geometry image. The smoothed image can be provided to the texture image generation (312). Then, the texture image generation (312) may adjust the generation of the texture image based on the reconstructed geometry images. For example, when a patch shape (e.g., geometry) is slightly distorted during encoding and decoding, the distortion may be taken into account when generating the texture images to correct for the distortion in patch shape.

In some embodiments, the group dilation (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, and/or the compressed auxiliary patch information into a compressed bitstream.

Figure 4:
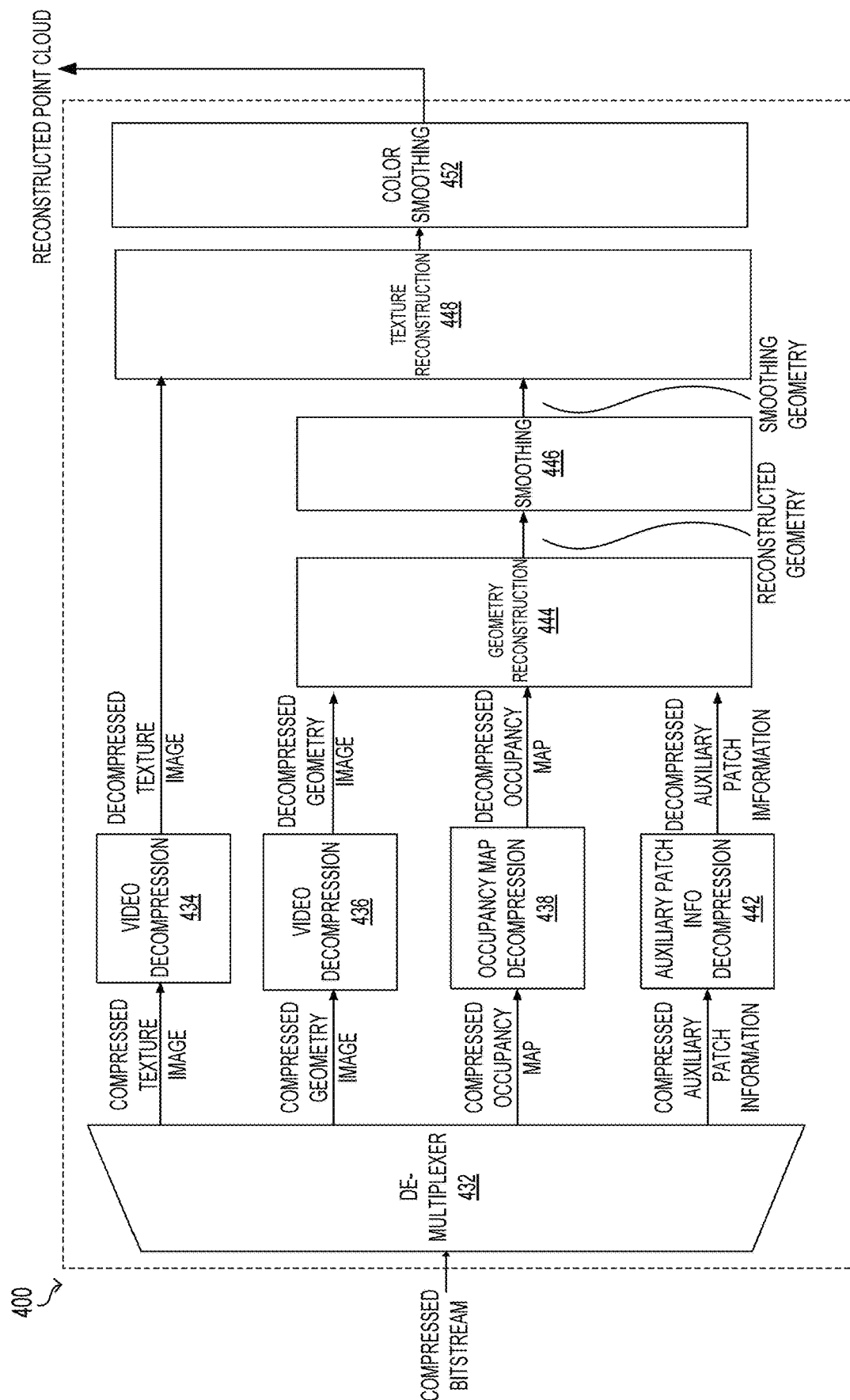
FIG. 4 shows a block diagram of a decoder for decoding a compressed bitstream corresponding to point cloud frames according to some embodiments.

FIG. 4 shows a block diagram of a V-PCC decoder (400) for decoding a compressed bitstream corresponding to point cloud frames, according to some embodiments. In some embodiments, the V-PCC decoder (400) can be used in the communication system (100) and streaming system (200). For example, the decoder (210) can be configured to operate in a similar manner as the V-PCC decoder (400). The V-PCC decoder (400) receives the compressed bitstream, and generates a reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448), and a color smoothing module (452).

The de-multiplexer (432) can receive and separate the compressed bitstream into a compressed texture image, compressed geometry image, compressed occupancy map, and compressed auxiliary patch information.

The video decompression modules (434) and (436) can decode the compressed images according to a suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to a suitable standard (e.g., HEVC, VVC, etc.) and output decompressed occupancy maps.

The auxiliary patch-information decompression module (442) can decode the compressed auxiliary patch information according to a suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
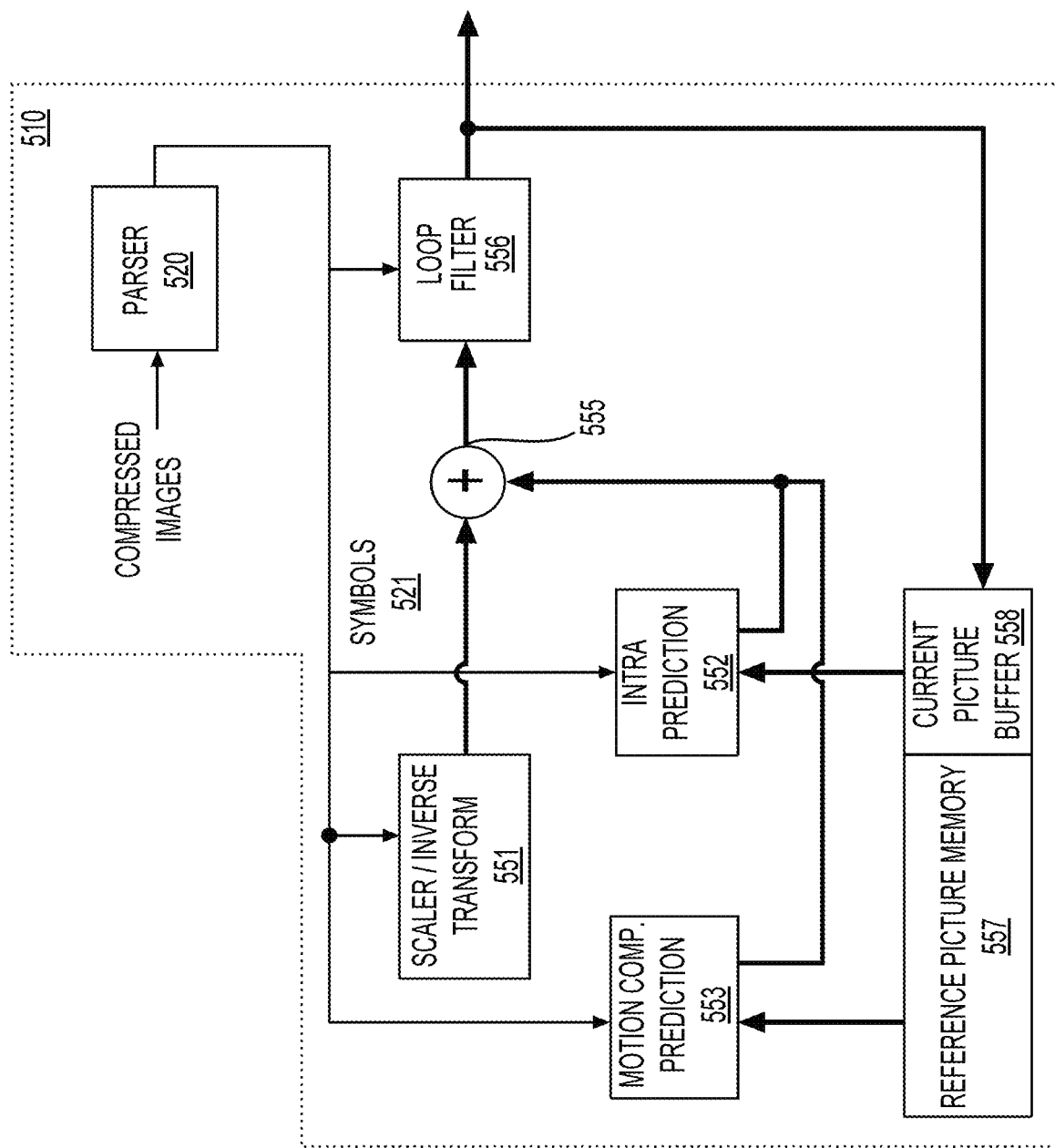
FIG. 5 is a schematic illustration of a simplified block diagram of a video decoder in accordance with an embodiment.

FIG. 5 shows a block diagram of a video decoder (510) according to an embodiment of the present disclosure. The video decoder (510) can be used in the V-PCC decoder (400). For example, the video decompression modules (434) and (436), the occupancy map decompression module (438) can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (e.g., inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, a partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a render device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
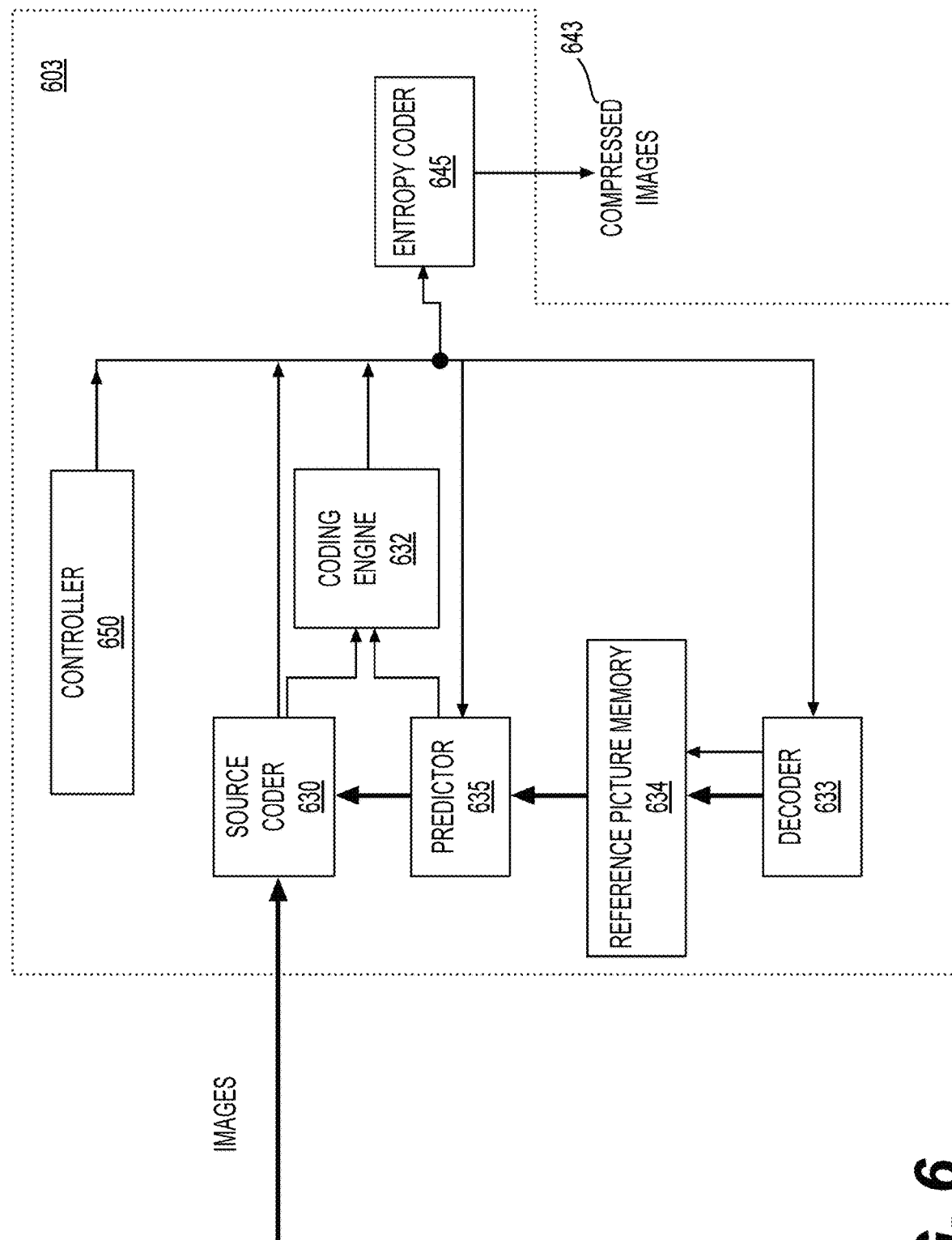
FIG. 6 is a schematic illustration of a simplified block diagram of a video encoder in accordance with an embodiment.

FIG. 6 shows a block diagram of a video encoder (603) according to an embodiment of the present disclosure. The video encoder (603) can be used in the V-PCC encoder (300) that compresses point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously-coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols to generate compressed images 643 according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (e.g., blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

The G-PCC model can separately compress the geometry information and the associated attributes such as color or reflectance. The geometry information, which is the 3D coordinates of the point clouds, can be coded by octree-decomposition of its occupancy information. On the other hand, the attributes can be compressed based on reconstructed geometry using prediction and lifting techniques. The octree-partition process is discussed in FIGS. 7-13 for example.

Figure 7:
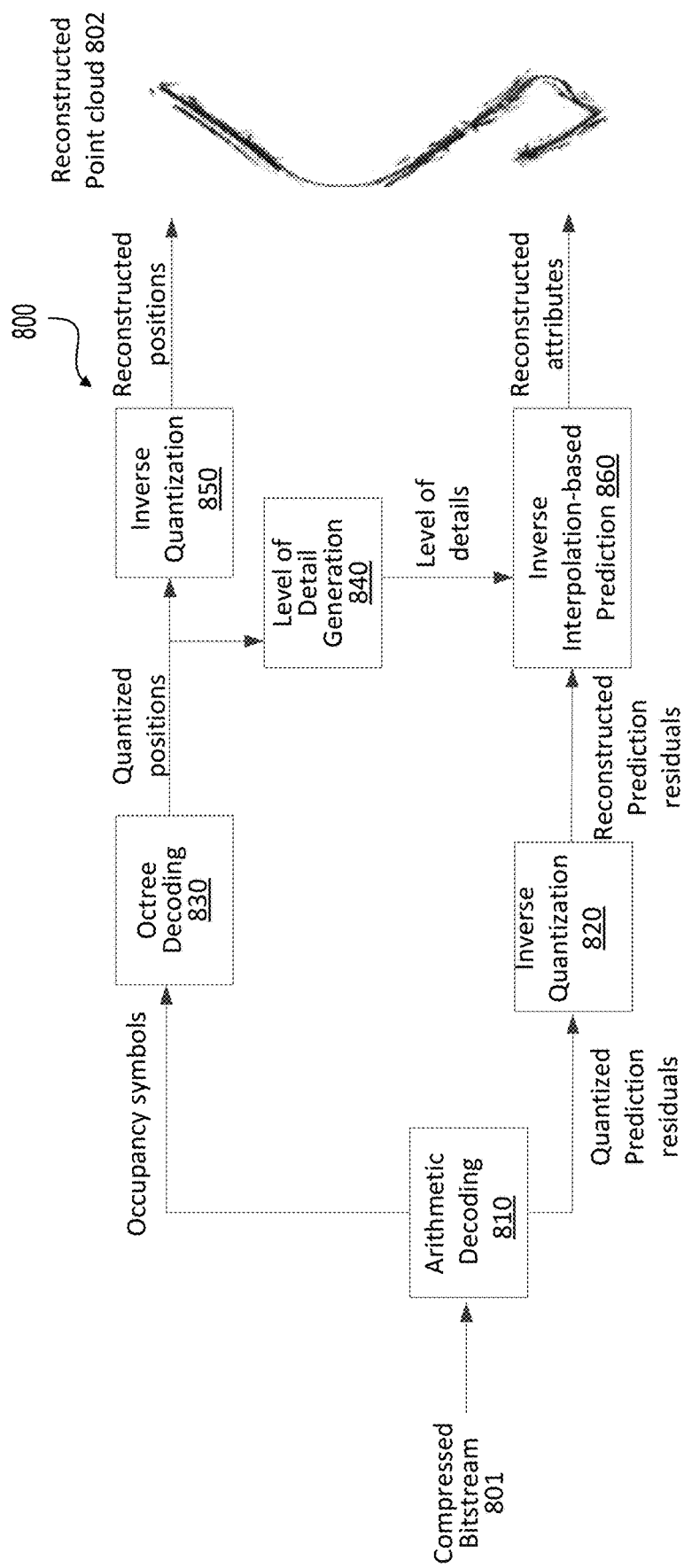
FIG. 7 shows a block diagram of a decoder for decoding a compressed bitstream corresponding to point cloud frames according to some embodiments.

FIG. 7 shows a block diagram of a G-PCC decoder (800) that is applied during a G-PCC decomposition process in accordance with an embodiment. The decoder (800) can be configured to receive a compressed bitstream and perform point cloud data decompression to decompress the bitstream to generate decoded point cloud data. In an embodiment, the decoder (800) can include an arithmetic decoding module (810), an inverse quantization module (820), an octree decoding module (830), an LOD generation module (840), an inverse quantization module (850), and an inverse interpolation-based prediction module (860).

As shown, a compressed bitstream (801) can be received at the arithmetic decoding module (810). The arithmetic decoding module (810) is configured to decode the compressed bitstream (801) to obtain quantized prediction residuals (if generated) and occupancy codes (or symbols) of a point cloud. The octree decoding module (830) is configured to generate quantized positions of points in the point cloud according to the occupancy codes. The inverse quantization module (850) is configured to generate reconstructed positions of the points in the point cloud based on the quantized positions provided by the octree decoding module (830).

The LOD generation module (840) is configured to reorganize the points into different LODs based on the reconstructed positions, and determine an LOD-based order. The inverse quantization module (820) is configured to generate reconstructed prediction residuals based on the quantized prediction residuals received from the arithmetic decoding module (810). The inverse interpolation-based prediction module (860) is configured to perform an attribute prediction process to generate reconstructed attributes of the points in the point cloud based on the reconstructed prediction residuals received from the inverse quantization module (820) and the LOD-based order received from the LOD generation module (840).

Further, the reconstructed attributes generated from the inverse interpolation-based prediction module (860) together with the reconstructed positions generated from the inverse quantization module (850) correspond to a decoded point cloud (or reconstructed point cloud) (802) that is output from the decoder (800) in one example.

Figure 8:
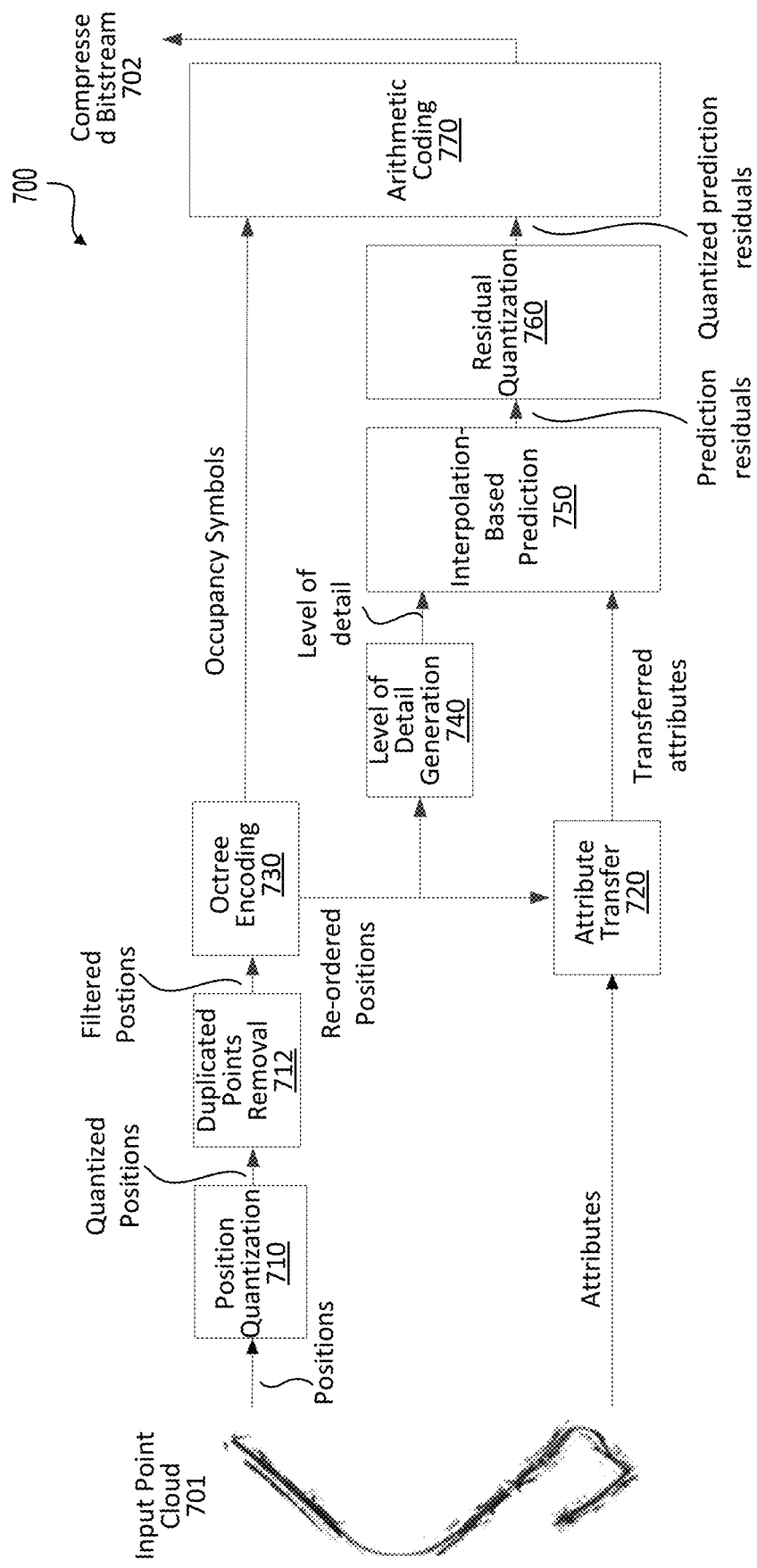
FIG. 8 shows a block diagram of an encoder for encoding point cloud frames, according to some embodiments.

FIG. 8 shows a block diagram of a G-PPC encoder (700) in accordance with an embodiment. The encoder (700) can be configured to receive point cloud data and compress the point cloud data to generate a bit stream carrying compressed point cloud data. In an embodiment, the encoder (700) can include a position quantization module (710), a duplicated points removal module (712), an octree encoding module (730), an attribute transfer module (720), a level of detail (LOD) generation module (740), an interpolation-based prediction module (750), a residual quantization module (760), and an arithmetic coding module (770).

As shown, an input point cloud (701) can be received at the encoder (700). Positions (e.g., 3D coordinates) of the point cloud (701) are provided to the quantization module (710). The quantization module (710) is configured to quantize the coordinates to generate quantized positions. The duplicated points removal module (712) is configured to receive the quantized positions and perform a filter process to identify and remove duplicated points. The octree encoding module (730) is configured to receive filtered positions from the duplicated points removal module (712), and perform an octree-based encoding process to generate a sequence of occupancy codes (or symbols) that describe a 3D grid of voxels. The occupancy codes are provided to the arithmetic coding module (770).

The attribute transfer module (720) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (730). The attributes after the transfer operations are provided to the interpolation-based prediction module (750). The LOD generation module (740) is configured to operate on the re-ordered points output from the octree encoding module (730), and re-organize the points into different LODs. LOD information is supplied to the interpolation-based prediction module (750).

The interpolation-based prediction module (750) processes the points according to an LOD-based order indicated by the LOD information from the LOD generation module (740) and the transferred attributes received from the attribute transfer module (720), and generates prediction residuals. The residual quantization module (760) is configured to receive the prediction residuals from the interpolation-based prediction module (750), and perform quantization to generate quantized prediction residuals. The quantized prediction residuals are provided to the arithmetic coding module (770). The arithmetic coding module (770) is configured to receive the occupancy codes from the octree encoding module (730), the candidate indices (if used), the quantized prediction residuals from the interpolation-based prediction module (750), and other information, and perform entropy encoding to further compress the received values or information. As a result, a compressed bitstream (702) carrying the compressed information can be generated. The bitstream (702) may be transmitted, or otherwise provided, to a decoder that decodes the compressed bitstream, or may be stored in a storage device.

It is noted that the interpolation-based prediction module (750) and the inverse interpolation-based prediction module (860) configured to implement the attribute prediction techniques disclosed herein can be included in other decoders or encoders that may have similar or different structures from what is shown in FIG. 7 and FIG. 8. In addition, the encoder (700) and decoder (800) can be included in a same device, or separate devices in various examples.

In various embodiments, the encoder (300), the decoder (400), the encoder (700), and/or the decoder (800) can be implemented with hardware, software, or combination thereof. For example, the encoder (300), the decoder (400), the encoder (700), and/or the decoder (800) can be implemented with processing circuitry such as one or more integrated circuits (ICs) that operate with or without software, such as an application specific integrated circuit (ASIC), field programmable gate array (FPGA), and the like. In another example, the encoder (300), the decoder (400), the encoder (700), and/or the decoder (800) can be implemented as software or firmware including instructions stored in a non-volatile (or non-transitory) computer-readable storage medium. The instructions, when executed by processing circuitry, such as one or more processors, causing the processing circuitry to perform functions of the encoder (300), the decoder (400), the encoder (700), and/or the decoder (800).

Figure 9:
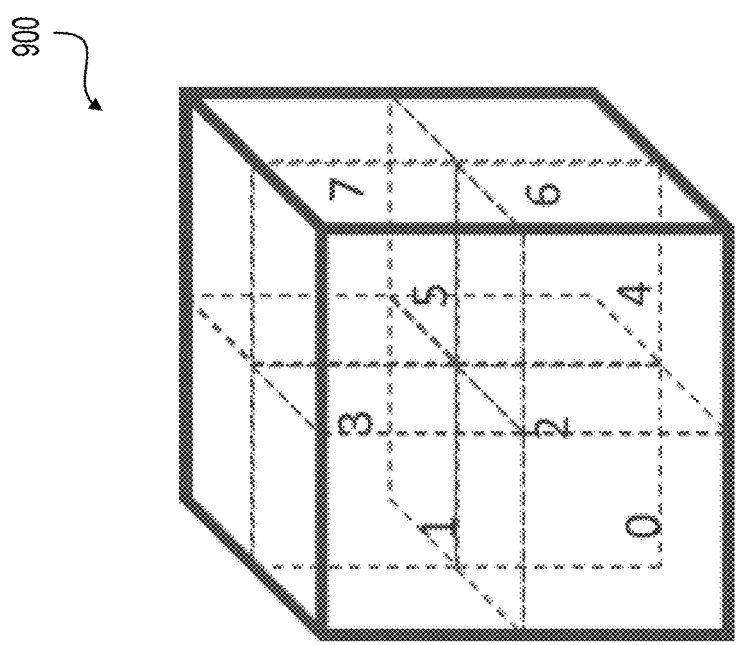
FIG. 9 shows a diagram illustrating a partition of a cube based on the octree partition technique according to some embodiments of the disclosure.

Partitioning of a point cloud that is defined by a 3D cube in a symmetric manner along all axes (e.g., x, y and z axis) can result in eight sub-cubes, which is known as an octree (OT) partition in point cloud compression (PCC). The OT partition resembles a binary-tree (BT) partition in one-dimensional and a quadtree (QT) partition in a two-dimensional space. The idea of OT partition can be illustrated in FIG. 9, where a 3D cube (900) in solid can be partitioned into eight smaller equal-sized cubes in dashed lines. As shown in FIG. 9, the octree partition technique can divide the 3D cube (900) into eight smaller equal-sized cubes 0-7.

In the octree partition technique (e.g., in TMC13), if the Octree geometry codec is used, the geometry encoding proceeds as follows. First, a cubical axis-aligned bounding box B can be defined by two extreme points (0,0,0) and ($2^d$, $2^d$, $2^d$) where $2^d$ defines a size of the bounding box B and d can be encoded to a bitstream. Accordingly, all the points inside the defined bounding box B can be compressed.

An octree structure can then be built by recursively subdividing the bounding box B. At each stage, a cube can be subdivided into 8 sub-cubes. A size of a sub-cube after being iteratively subdividing k (k≤d) times can be ($2^{d-k}$, $2^{d-k}$, $2^{d-k}$). An 8-bit code, such as an occupancy code, can then be generated by associating a 1-bit value with each sub-cube in order to indicate whether the corresponding sub-cube contains points (i.e., full and has value 1) or not (i.e., empty and has value 0). Only full sub-cubes with a size greater than 1 (i.e., non-voxels) can further be subdivided. The occupancy code for each cube can then be compressed by an arithmetic encoder.

The decoding process can start by reading from the bitstream dimensions of the bounding box B. A same octree structure can then be built by subdividing the bounding box B according to the decoded occupancy codes. An example of two-level OT partition and the corresponding occupancy code can be shown in FIG. 10, where cubes and nodes that are shaded indicate the cubes and nodes are occupied by points.

Figure 10:
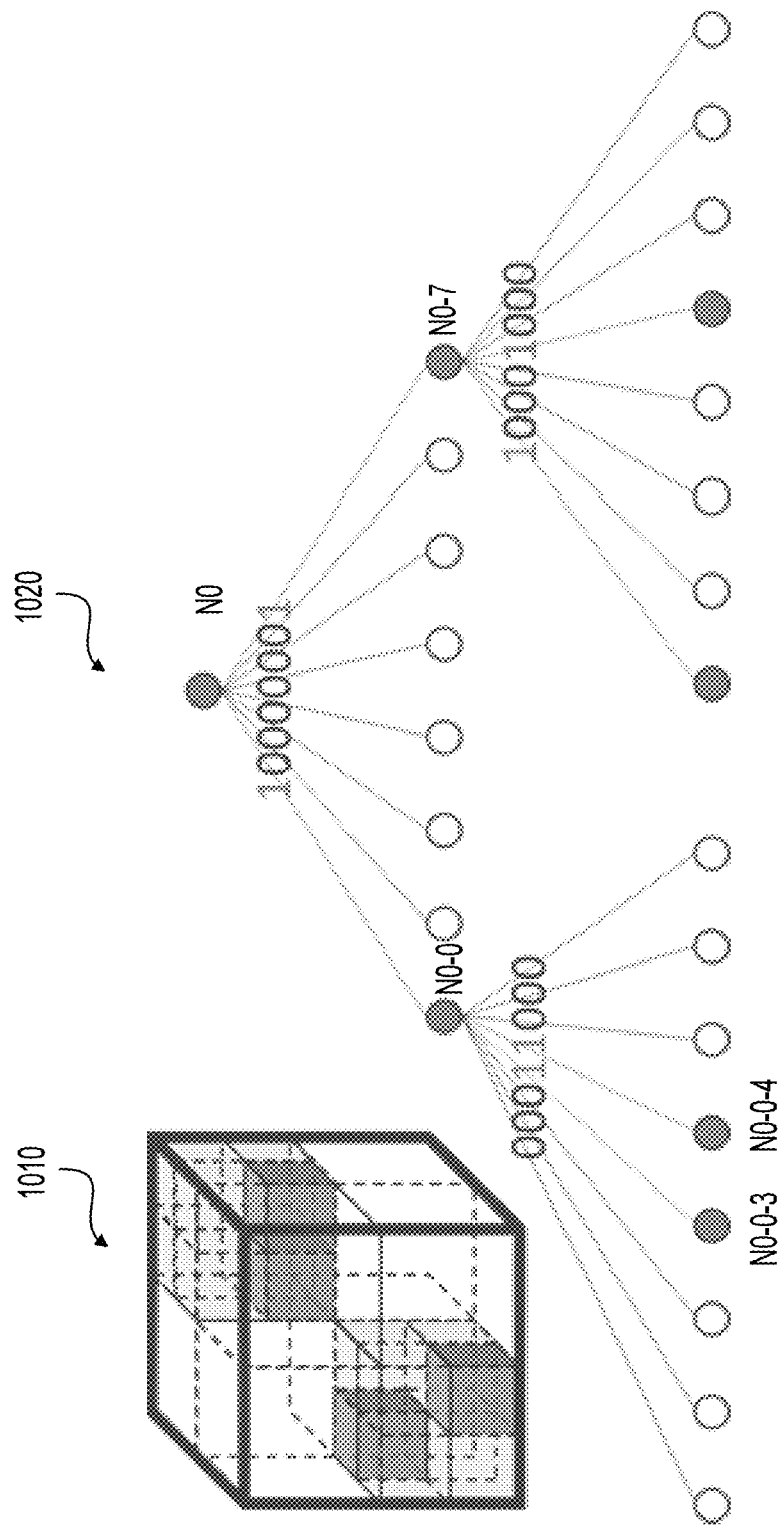
FIG. 10 shows an example of an octree partition and an octree structure corresponding to the octree partition according to some embodiments of the disclosure.

FIG. 10 shows an example of an octree partition (1010) and an octree structure (1020) corresponding to the octree partition (1010) according to some embodiments of the disclosure. FIG. 10 shows two levels of partitions in the octree partition (1010). The octree structure (1020) includes a node (N0) corresponding to the cubical box for octree partition (1010). At a first level, the cubical box is partitioned into 8 sub cubical boxes that are numbered 0-7 according to the numbering technique shown in FIG. 9. The occupancy code for the partition of the node N0 is "10000001" in binary, which indicates the first sub cubical box represented by node N0-0 and the eighth sub cubical box represented by node N0-7 includes points in the point cloud and other sub cubical boxes are empty.

Then, at the second level of partition, the first sub cubical box (represented by node N0-0) and the eighth sub cubical box (represented by node N0-7) are further respectively sub-divided into eight octants. For example, the first sub cubical box (represented by node N0-0) is partitioned into 8 smaller sub cubical boxes that are numbered 0-7 according to the numbering technique shown in FIG. 9. The occupancy code for the partition of the node N0-0 is "00011000" in binary, which indicates the fourth smaller sub cubical box (represented by node N0-0-3) and the fifth smaller sub cubical box (represented by node N0-0-4) includes points in the point cloud and other smaller sub cubical boxes are empty. At the second level, the seventh sub cubical box (represented by node N0-7) is similarly partitioned into 8 smaller sub cubical boxes as shown in FIG. 10.

In the FIG. 10 example, the nodes corresponding to non-empty cubical space (e.g., cubical box, sub cubical boxes, smaller sub cubical boxes and the like) are shaded in gray, and referred to as shaded nodes.

In the original TMC13 design, for example as described above, the bounding box B may be restricted to be a cube that has a same size for all dimensions, and the OT partition thus can be performed for all sub-cubes at each node at which the sub-cubes are halved in size for all dimensions. The OT partition can be performed recursively until the size of sub-cubes reaches one. However, the partition in such a manner might not be efficient for all cases, especially when the points are non-uniformly distributed in a 3D scene (or 3D space).

Figure 11:
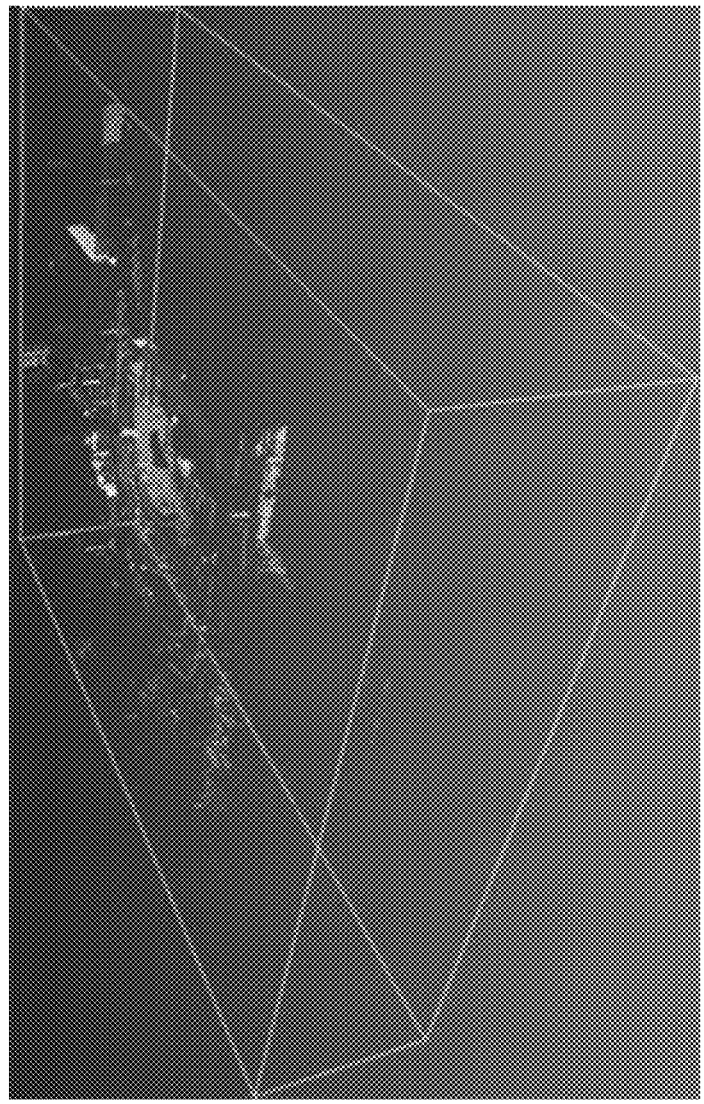
FIG. 11 shows a point cloud with a shorter bounding box in a z-direction according to some embodiments of the disclosure.
Figure 11:
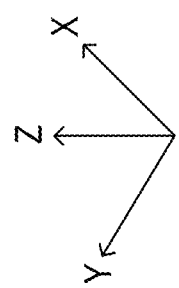

One extreme case could be a 2D plane in a 3D space, in which all the points can be located on a x-y plane in the 3D space and the variation in the z-axis can be zero. In such a case, OT partition performed on a cubic B as a starting point could waste extensive bits to represent occupancy information in the z-direction, which is redundant and not useful. In real applications, the worst case may not occur often. However, it is typical to have a point cloud that has less variance in one direction compared to others. As shown in FIG. 11, a point cloud sequence named "ford_01_vox1mm" in TMC13 can have principle components in x and y directions. In fact, many point cloud data generated from a Lidar system can have the same characteristics.

In a quad-tree and binary-tree (QtBt) partitions, the bounding box B may not be restricted to be a cube, instead the bounding box B can be an arbitrary-sized rectangular cuboid to better fit for the shape of the 3D scene or objects. In the implementation, the size of the bounding box B can be represented as a power of two, e.g., $(2^{d_x}, 2^{d_y}, 2^{d_z})$.

As bounding box B may not be a perfect cube, in some cases the node may not be (or unable to be) partitioned along all directions. If a partition is performed on all three directions, the partition is a typical OT partition. If the partition is performed on two directions out of three, the partition is thus a QT partition in 3D. If the partition is performed on one direction only, the partition is then a BT partition in 3D. Examples of QT and BT in 3D are shown in FIG. 12 and FIG. 13, respectively.

Figure 12:
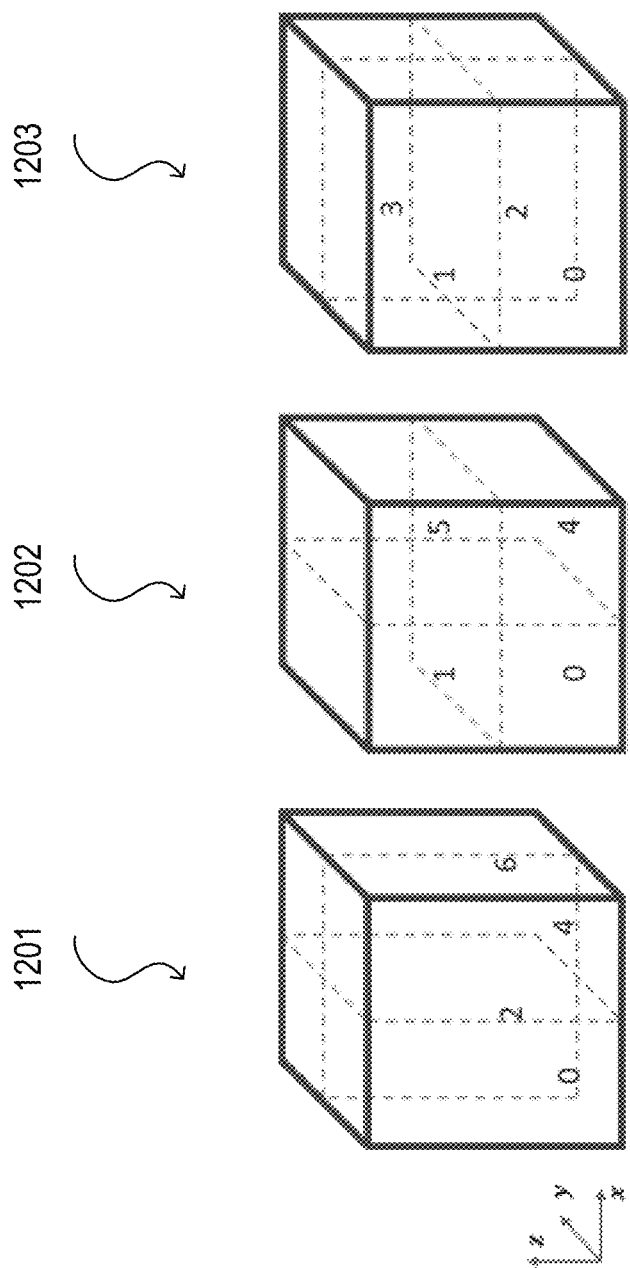
FIG. 12 shows a diagram illustrating partitions of a cube based on the octree partition technique along x-y, x-z, and y-z axes, according to some embodiments of the disclosure.
Figure 13:
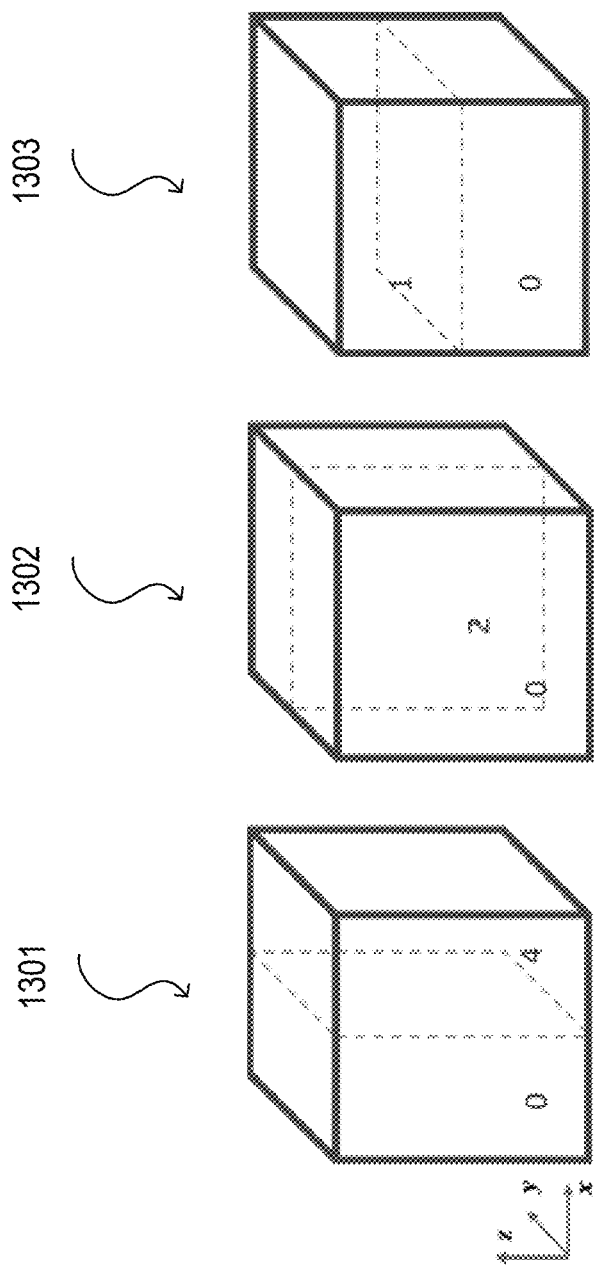
FIG. 13 shows a diagram illustrating partitions of a cube based on a binary partition technique along x, y, and z axes, according to some embodiments of the disclosure.

As shown in FIG. 12, a 3D cube 1201 can be partitioned along x-y axes into 4 sub-cubes 0, 2, 4, and 6. A 3D cube 1202 can be partitioned along x-z axes into 4 sub-cubes 0, 1, 4 and 5. A 3D cube 1203 can be partitioned along y-z axes into 4 sub-cubes 0, 1, 2 and 3. In FIG. 13, a 3D cube 1301 can be partitioned along an x axis into 2 sub-cubes 0 and 4.

A 3D cube 1302 can be partitioned into 2 sub-cubes 0 and 2. A 3D cube 1303 can be partitioned into 2 sub-cubes 0 and 1.

In order to define conditions of implicit QT and BT partitions in TMC13, two parameters (i.e., K and M) can be applied. The first parameter K ($0 \leq K \leq \max(d_x, d_y, d_z) - \min(d_x, d_y, d_z)$) can define maximum times of implicit QT and BT partitions that can be performed before OT partitions. The second parameter M ($0 \leq M \leq \min(d_x, d_y, d_z)$) can define a minimal size of implicit QT and BT partitions, indicating that implicit QT and BT partitions are allowed only if all dimensions are greater than M.

More specifically, the first K partitions can follow rules in Table I, and partitions subsequent to the first K partitions can follow rules in Table II. If none of the conditions listed in tables are met, an OT partition can be performed.

TABLE I

Conditions to perform implicit QT or BT partition for the first K partitions.

| | QT along x-y axes | QT along x-z axes | QT along y-z axes |
|---|---|---|---|
| Condition | $d_z < d_x = d_y$ | $d_y < d_x = d_z$ | $d_x < d_y = d_z$ |
| | BT along x axis | BT along y axis | BT along z axis |
| Condition | $d_y < d_x$ and $d_z < d_x$ | $d_x < d_y$ and $dz < d_y$ | $d_x < d_z$ and $d_y < d_z$ |

TABLE II

Conditions to perform implicit QT or BT partition after the first K partitions.

| | QT along x-y axes | QT along x-z axes | QT along y-z axes |
|---|---|---|---|
| Condition | $d_z = M < d_x = d_y$ | $d_y = M < d_x = d_z$ | $d_x = M < d_y = d_z$ |
| | BT along x axis | BT along y axis | BT along z axis |
| Condition | $d_y = M \leq d_z < d_x$; $d_z = M \leq d_y < d_x$ | $d_x = M \leq d_z < d_y$; $d_z = M \leq d_x < d_y$ | $d_x = M \leq d_y < d_z$; $d_y = M \leq d_x < d_z$ |

In an embodiment, the bounding box B can have a size of $(2^{d_x}, 2^{d_y}, 2^{d_z})$. Without loss of generality, conditions $0 < d_x \leq d_y \leq d_z$ can be applied to the bounding box B. Based on the conditions, at first K ($K \leq d_z - d_x$) depths, implicit BT partitions can be performed along a z axis and implicit QT partitions can then be performed along y-z axes according to Table I. The size of sub-nodes then can become $2^{(d_x, d_x + \delta_y, d_x + \delta_z)}$, where the value of $\delta_y$ and $\delta_z$ ($\delta_z \geq \delta_y \geq 0$) can depend on the value of K. Further, OT partitions can be performed $d_x - M$ times so that the remaining sub-nodes can have a size of $2^{(M, M+\delta_y, M+\delta_z)}$. Next, according to Table II, implicit BT partitions can be performed along the z-axis $\delta_z - \delta_y$ times, and implicit QT partitions can then be performed along y-z axes $\delta_y$ times. The rest of the nodes thus can have a size of $2^{(M,M,M)}$. Therefore, OT partitions can be performed M times to reach the smallest units.

In QtBt partitions, an implicit rule is provided on how to apply partitioning of a given cuboid by switching among Octree, Quadtree, and Binary-tree at each level of node decomposition. After the K levels of initial decomposition via QtBt partitions according to a rule (e.g., Table I), another round of QtBt partition can be performed according to another rule (e.g., Table II). If none of conditions in the rules is met in the above processes, Octree decomposition (or octree partition) can be applied.

The implicit rule can impact the effectiveness of QtBt as follows:
(1) for point cloud data with an almost symmetric cuboid bounding box along x, y and z dimensions, QtBt partition has not shown coding gains over the related method (e.g., the implicit QtBt partition), which is performing Ot (Octree) decomposition at all levels; and (2) for point cloud data with a highly asymmetric cuboid bounding box along x, y and z dimensions, QtBt partition has shown coding gains by skipping sending of unnecessary occupancy information during the decomposition.

In the current QtBt partitions, certain restrictions can be placed as follows. First, the QtBt partitions can always enforce the use of asymmetric bounding box, which may not be useful or even counter-productive when the point cloud has an almost symmetric bounding box. Second, Table I together with the parameter K can reduce the larger dimensions according to the rule by enforcing Qt/Bt partitions instead of Ot partition. However, Table I together with the parameter K may not allow a Qt or Bt partition at the beginning when the bounding box is symmetric. Third, Table II can be applied after the above K times of split and kicks in when the minimum dimension of sub-boxes reaches M. Thus, Table II can reduce the larger dimensions according to the rule until all dimensions become equal to M. Fourth, the current implicit rule (or implicit QtBt partitions) can always mandate octree decomposition after the first (up to) K levels until the current QtBt partitions reach the level M. In other words, the current QtBt partitions may not allow arbitrary Qt/Bt/Ot partitions to be chosen in between the two level-points.

In the present disclosure, multiple methods are provided. The methods provide for simplification of the QtBt design (e.g., the implicit QtBt partitions) in TMC 13 for typical use case, for examples based upon the discussion above. The methods also allow for more flexible ways of partitioning, for example by explicitly signaling the node decomposition type at each level.

In an embodiment, a first partition method (or simplified QtBt partition) can be provided. The first partition method can be a special case of the implicit QtBt partitions, which can be applied to data sets with highly asymmetric bounding boxes by setting K=0 & M=0. The first partition method can simplify the QtBt design (e.g., QtBt partitions) and still bring about coding benefits for typical cases as noted above.

Comparing to the QtBt partitions in TMC 13, the first partition method can include the following features: (1) an implicit enabled flag (e.g., implicit_qtbt_enabled_flag) in the QtBt partitions in TMC 13 can be removed. (2) an asymmetric bounding box flag (e.g., asymmetric_bbox_enabled_flag) can be introduced to enable the use of an asymmetric bounding box. In an example, when the asymmetric bounding box flag is set to a value such as 0 (also referred to a second value) for symmetric or almost symmetric bounding-box data and to a value such as 1 (also referred to as a first value) for highly asymmetric bounding-box data. (3) If the asymmetric bounding box flag is the first value, the implicitQtBt rule (e.g., Tables I and II) with K=0 & M=0 can be applied when the node decomposition level reaches 0 (or a last level). Otherwise, if the asymmetric bounding box flag is the second value, the first partition method can perform Octree decomposition (or Octree partition).

According to the first partition method, the implicitQtBt rule shown in Table II with M=0 can be applied in order to skip sending unnecessary occupancy information along some dimensions, such as shown in Table III.

TABLE III

| Conditions to perform implicit QtBt partition at level 0 | | | |
|---|---|---|---|
| | QT along x-y axes | QT along x-z axes | QT along y-z axes |
| Condition | $d_z = 0 < d_x = d_y$ | $d_y = 0 < d_x = d_z$ | $d_x = 0 < d_y = d_z$ |
| | BT along x axis | BT along y axis | BT along z axis |
| Condition | $d_y = 0 \leq d_z < d_x$ $d_z = 0 \leq d_y < d_x$ | $d_x = 0 \leq d_z < d_y$ $d_z = 0 \leq d_x < d_y$ | $d_x = 0 \leq d_y < d_z$ $d_y = 0 \leq d_x < d_z$ |

In an embodiment, a second partition method (or explicit QtBt partition) can be provided to send explicit signaling of a split-decision. The explicit signaling can be provided as opposed to the use of a fixed implicit rule in the current QtBt partition.

The second partition method can include following features: (1) an explicit QtBt enabled flag (e.g., explicit_qtbt_enabled_flag) can be introduced to enable/disable explicit split-decision signaling while the asymmetric bounding box flag from the first partition method can still be introduced. (2) When the explicit QtBt enabled flag is set to a value such as 0 (or a second value), the second partition method falls back to (or can equal to) the first partition method that is described above. Thus, if the asymmetric bounding box flag (e.g., asymmetric_bbox_enabled_flag) is a value such as 1 (or a first value), the implicitQtBt rule (e.g., Tables I and II) with K=0 & M=0 can be applied when the node decomposition level reaches 0 (or a last level). If the asymmetric bounding box flag is the second value, the second partition method can perform Octree decomposition (or Octree partition). In an embodiment, when the asymmetric bounding box flag is not used, and the explicit QtBt enabled flag is set to the second value (e.g., 0), the second partition method can apply Octree-decomposition (or Octree-partition) for all levels. (4) When the explicit QtBt enabled flag is set to the first value (e.g., 1), instead of always performing octree-split until the level reaches 0 (or a last level) as mentioned in the first partition method, a 3-bit signal can be sent in each of the octree-levels to indicate whether to split along each of the x, y and z axes. Thus, the 3-bit signal can indicate if a Bt partition, a Qt partition, or a Ot partition can be applied in each of the octree-levels. In some embodiments, the implicitQtBt rule (e.g., Tables I and II) in TMC 13 can be applied to determine the 3-bit signal in each of the octree-levels.

It should be noted that as Ot/Qt/Bt partition is allowed in an arbitrary manner along the way when the explicit QtBt enabled flag is set to the first value in the second partition method, the maximum possible total number of splits can be three times a difference of maximum and minimum node depths.

In an embodiment of the disclosure, a third partition method (or explicit QtBt type-2 partition can be provided to send explicit signaling of a split-decision. The explicit signaling can be provided as opposed to the use of a fixed implicit rule in the current QtBt partition (e.g., Tables I and II). The third partition method can include the following features as compared to the current QtBt partition: (1) an explicit QtBt enabled flag (e.g., explicit_qtbt_enabled_flag) can replace the implicit QtBt enabled flag (e.g., implicit_qtbt_enabled_flag) in the QtBt partitions in TMC 13 to enable/disable explicit split-decision signaling. (2) An asymmetric bounding box flag (e.g., asymmetric_bbox_enabled_flag) can be additionally signaled only when the explicit QtBt enabled flag is a value such as 1 (or a first value) to enable/disable the use of an asymmetric bounding box. When the asymmetric bounding box flag is the first value, the asymmetric bounding box dimensions (i.e., sizes) along x, y and z can further be signaled as opposed to the maximum of the three. Accordingly, the asymmetric bounding box flag can be set to a value such as 0 (e.g., a second value) for symmetric or almost symmetric bounding-box data and to the first value (e.g., 1) for highly asymmetric bounding-box data. (3) When the explicit QtBt enabled flag is set to the first value, a 3-bit signal can be sent in each of the octree-levels (or octree partition levels) to indicate whether to split along each of the x, y and z axes. In an embodiment, the implicitQtBt rule (e.g., Tables I and II) in TMC 13 can be applied to determine the 3-bit signal for each of the octree-levels. In another embodiment, other splitting rules can be applied to determine the 3-bit signal for each of the octree-levels. The other splitting rules can facilitate the coding of octree occupancy information and further take into account the characteristics of the data (e.g., octree occupancy information) or an acquisition mechanism of the date. (4) When the explicit QtBt enabled flag is set to the second value (e.g., 0), the third partition method can apply octree-decomposition (octree-partition) for all levels.

It should be noted that as Ot/Qt/Bt partition is allowed in an arbitrary manner along the way when the explicit QtBt enabled flag is set to the first value in the third partition method, the maximum possible total number of splits can be three times a difference of maximum and minimum node depths.

In an embodiment of the disclosure, a fourth partition method (or flexible QtBt partition) can be provided to provide more flexibility in the use of QtBt partition by an additional signaling of the type of QtBt partition either as explicit or implicit. The addition signaling can be provided as opposed to the use of a fixed implicit rule in the current QtBt partition (e.g., Tables I and II).

The fourth partition method can include: (1) a QtBt enabled flag (e.g., qtbt_enabled_flag) can be applied to replace an implicit QtBt enabled flag in the QtBt partition in TMC 13 to indicate the use of QtBt partition with more flexibility. (2) A QtBt type flag (e.g., qtbt_type_flag) can be additionally signaled when the QtBt enabled flag is set to a value such as 1. (3) If the QtBt type flag is set to a value such as 0, the current implicit QtBt scheme (e.g., Tables I and II) can be applied. In addition, an asymmetric bounding box flag (e.g., asymmetric_bbox_enabled_flag) can be additionally signaled to selectively enable/disable the use of an asymmetric bounding box. In an embodiment, when the asymmetric bound box flag is set to a value such as 1, the asymmetric bounding box dimensions (i.e., sizes) along x, y and z can be signaled as opposed to the maximum of the three. In another embodiment, when the asymmetric bound box flag is not signaled, the asymmetric bounding box can always be used.

The fourth partition method can also include: (4) If the QtBt type flag is a value such as 1, a 3-bit signal can be sent to each of the octree-levels to indicate whether to split along each of the x, y and z axes. In an embodiment, the implicitQtBt rule (e.g., Tables I and II) in TMC 13 can be applied to determine the 3-bit signal for each of the octree-levels. In another embodiment, other splitting rules can be applied to determine the 3-bit signal for each of the octree-levels. The other splitting rules can facilitate the coding of octree occupancy information and further take into account the characteristics of the data (e.g., octree occupancy information) or an acquisition mechanism of the date. In an embodiment, the asymmetric bound box flag can be additionally signaled to selectively enable/disable the use of asymmetric bounding box. When the asymmetric bound box flag is a value such as 1, the asymmetric bounding box dimensions (i.e., sizes) along x, y and z can be signaled as opposed to the maximum of the three. In another embodiment, the asymmetric bound box flag may not be signaled and an asymmetric bounding box can always be used. (5) When a QtBt enabled flag is set to a value such as 0, the fourth partition method can apply octree-decomposition (or octree-partition) for all levels.

It should be noted that as Ot/Qt/Bt partition is allowed in an arbitrary manner along the way when the explicit QtBt enabled flag is set to a value such as 1 in the fourth partition method, the maximum possible total number of splits can be three times a difference of maximum and minimum node depths.

The above techniques can be implemented in a video encoder or decoder adapted for point cloud compression/decompression. The encoder/decoder can be implemented in hardware, software, or any combination thereof, and the software, if any, can be stored in on or more non-transitory computer readable media. For example, each of the methods (or embodiments), encoders, and decoders may be implemented by processing circuitry (e.g., one or more processors or one or more integrated circuits). In one example, the one or more processors execute a program that is stored in a non-transitory computer-readable medium.

Figure 14:
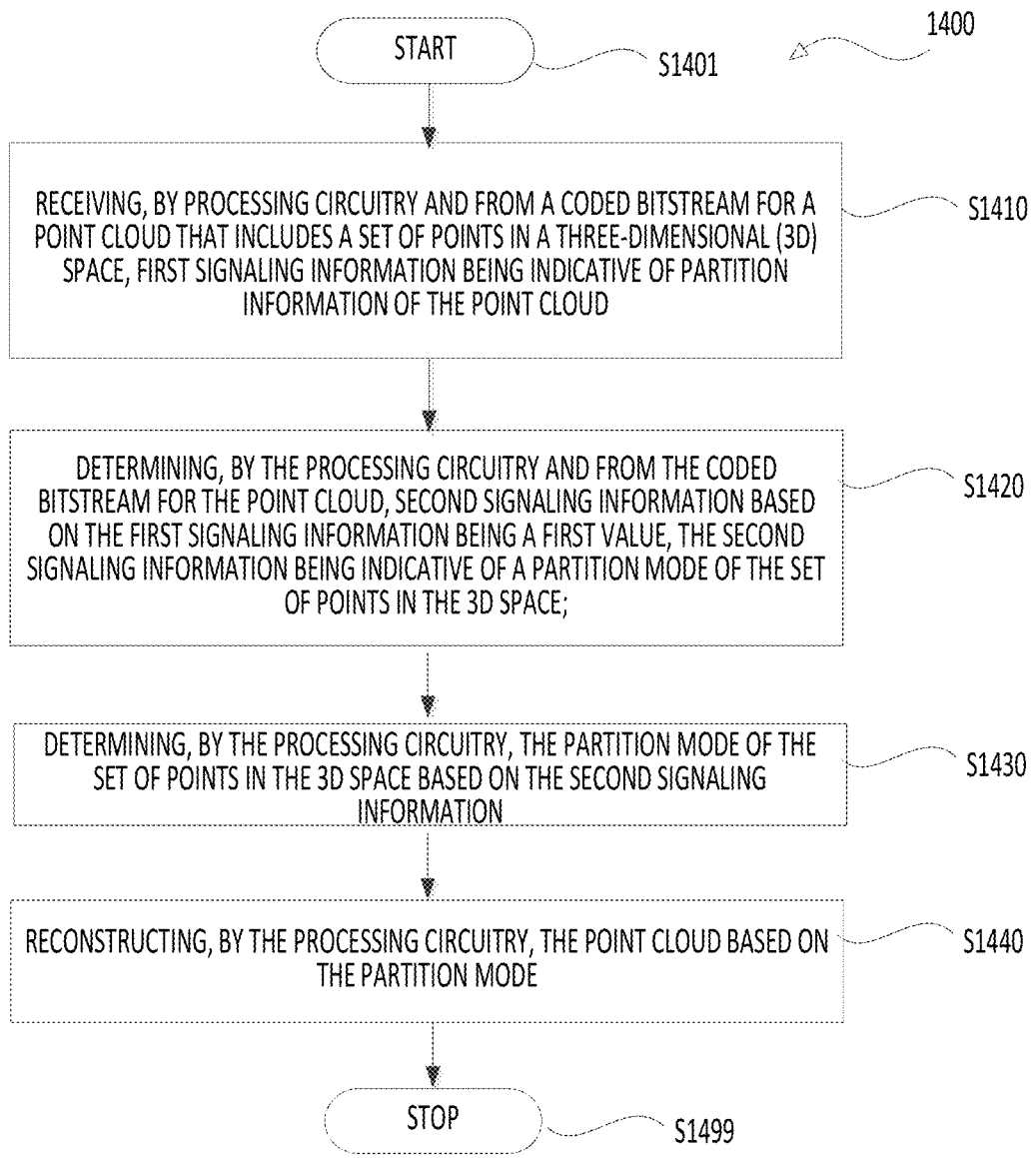
FIG. 14 shows a first flow chart outlining a first process example in accordance with some embodiments.
Figure 15:
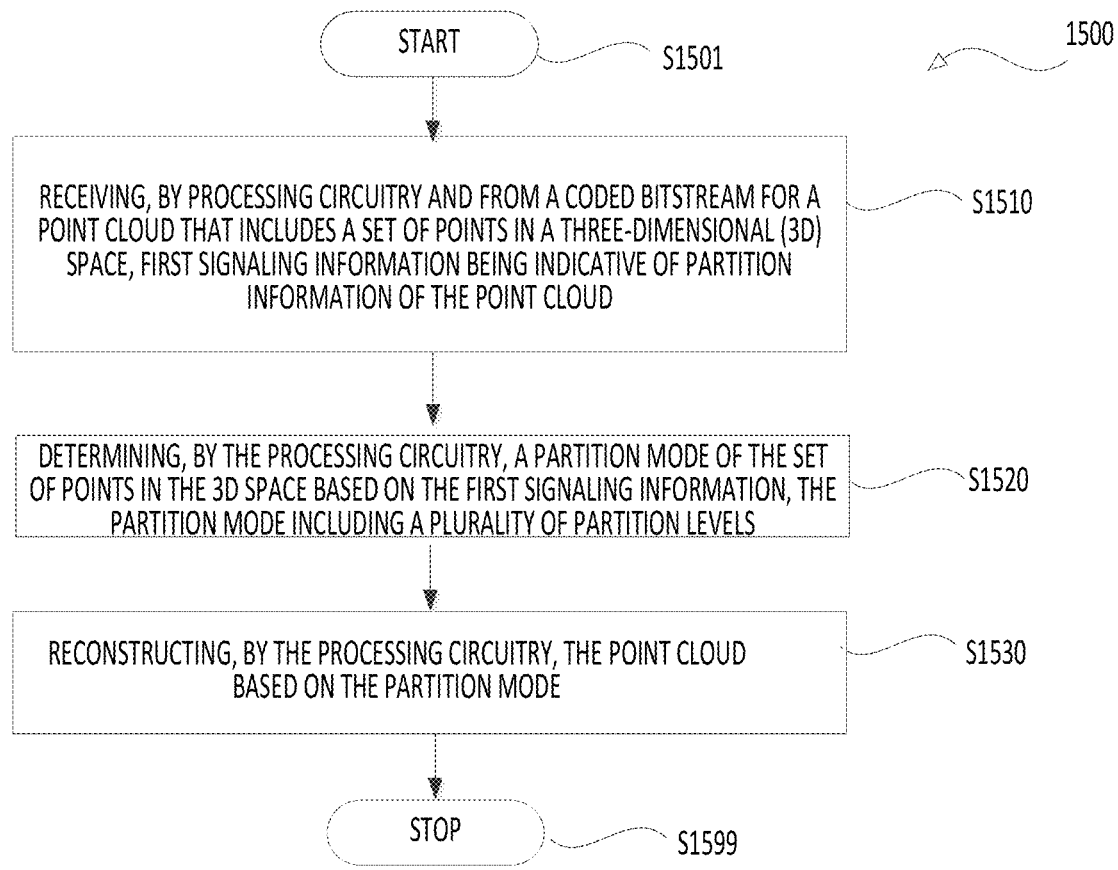
FIG. 15 shows a second flow chart outlining a second process example in accordance with some embodiments.

FIGS. 14 and 15 show flow charts outlining a process (1400) and a process (1500) according to embodiments of the disclosure. The processes (1400) and (1500) can be used during decoding processes for point clouds. In various embodiments, the processes (1400) and (1500) can be executed by processing circuitry, such as the processing circuitry in the terminal devices (110), the processing circuitry that performs functions of the encoder (203) and/or the decoder (201), the processing circuitry that performs functions of the encoder (300), the decoder (400), the encoder (700), and/or the decoder (800), and the like. In some embodiments, the processes (1400) and (1500) can be implemented in software instructions, thus when the processing circuitry executes the software instructions, the processing circuitry performs the processes (1400) and (1500) respectively.

As shown in FIG. 14, the process (1400) starts at (S1401) and proceeds to (S1410).

At (S1410), first signaling information can be received from a coded bitstream for a point cloud that includes a set of points in a three-dimensional (3D) space. The first signaling information can indicate partition information of the point cloud.

At (S1420), second signaling information can be determined based on the first signaling information indicating a first value. The second signaling information can be indicative of a partition mode of the set of points in the 3D space.

At (S1430), the partition mode of the set of points in the 3D space can be determined based on the second signaling information. The process (1400) can then proceed to (S1440), where the point cloud can be reconstructed subsequently based on the partition mode.

In some embodiments, the partition mode can be determined to be a pre-defined Quad-tree and Binary-tree (QtBt) partition based on the second signaling information being a second value.

In the process (1400), third signaling information can be received that indicates the 3D space is an asymmetric cuboid. Dimensions of the 3D space that are signaled along x, y, and z directions can be determined based on the third signaling information being the first value.

In some embodiments, 3-bit signaling information can be determined for each of a plurality of partition levels in the partition mode based on the second signaling information being the first value. The 3-bit signaling information for each of the plurality of partition levels can be indicative of partition directions along x, y, and z directions for the respective partition level in the partition mode.

In some embodiments, the 3-bit signaling information can be determined based on dimensions of the 3D space.

In the process (1400), the partition mode can be determined based on the first signaling information being a second value, where the partition mode can include a respective octree-partition in each of a plurality of partition levels in the partition mode.

As shown in FIG. 15, the process (1500) starts at (S1501) and proceeds to (S1510).

At (S1510), first signaling information can be received from a coded bitstream for a point cloud that includes a set of points in a three-dimensional (3D) space. The first signaling information can be indicative of partition information of the point cloud.

At (S1520), a partition mode of the set of points in the 3D space can be determined based on the first signaling information, where the partition mode can include a plurality of partition levels.

At (S1530), the point cloud can subsequently be reconstructed based on the partition mode.

In some embodiments, 3-bit signaling information for each of a plurality of partition levels in the partition mode can be determined based on the first signaling information being a first value, where the 3-bit signaling information for each of the plurality of partition levels can be indicative of partition directions along x, y, and z directions for the respective partition level in the partition mode.

In some embodiments, the 3-bit signaling information can be determined based on dimensions of the 3D space.

In some embodiments, the partition mode can be determined to include a respective octree-partition in each of the plurality of partition levels in the partition mode based on the first signaling information being a second value.

In the process (1500), second signaling information can further be received from the coded bitstream for the point cloud. The second signaling information can indicate the 3D space is an asymmetric cuboid when the second signaling information is a first value, and the 3D space is a symmetric cuboid when the second signaling information is a second value.

In some embodiments, based on the first signal information indicating the second value and the second signal information indicating the first value, the partition mode can be determined to include a respective octree-partition in each of first partition levels in the plurality of partition levels of the partition mode. A partition type and a partition direction of a last partition level of the plurality of partition levels of the partition mode can be determined according to a table as follows:

| Partition type and direction | Qt along x-y axes | Qt along x-z axes | Qt along y-z axes |
|---|---|---|---|
| Condition | $d_z = 0 < d_x = d_y$ | $d_y = 0 < d_x = d_z$ | $d_x = 0 < d_y = d_z$ |
| Partition type and direction | Bt along x axis | Bt along y axis | Bt along z axis |
| Condition | $d_y = 0 \leq d_z < d_x$ $d_z = 0 \leq d_y < d_x$ | $d_x = 0 \leq d_z < d_y$ $d_z = 0 \leq d_x < d_y$ | $d_x = 0 \leq d_y < d_z$ $d_y = 0 \leq d_x < d_z$ | wherein the $d_x$, $d_y$, and $d_z$ are log2 sizes of the 3D space in the x, y, and z directions, respectively.

In the process (1500), second signaling information can be determined based on the first signaling information indicating a first value. The second signaling information can indicate the 3D space is an asymmetric cuboid when the second signaling information indicates the first value, and the 3D space is a symmetric cuboid when the second signaling information indicates a second value. Further, dimensions of the 3D space that are signaled along x, y, and z directions can be determined based on the second signaling information indicating the first value.

As noted above, techniques described above can be implemented as computer software using computer-readable instructions and physically stored in one or more computer-readable media. For example, FIG. 16 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
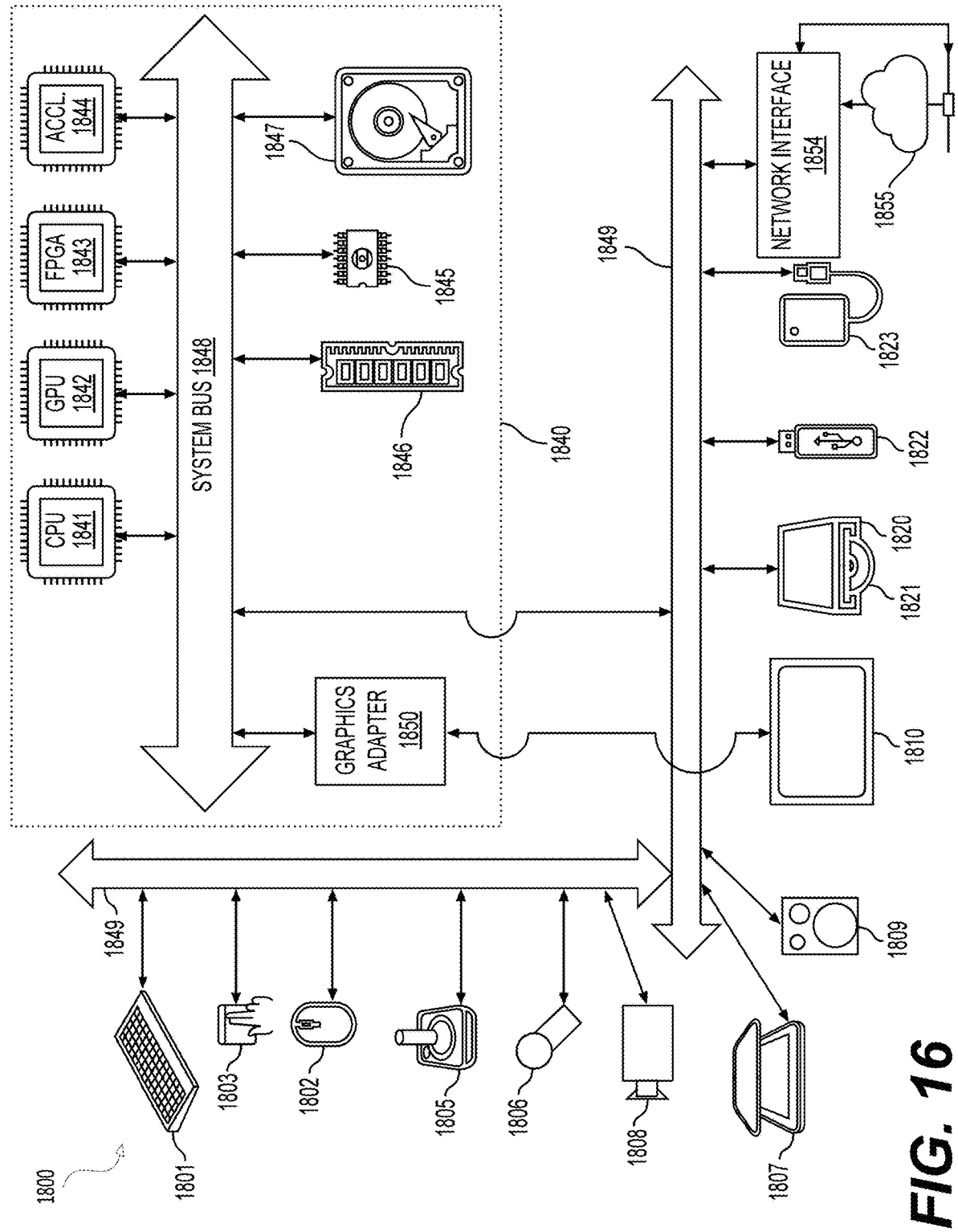
FIG. 16 is a schematic illustration of a computer system in accordance with an embodiment.

The components shown in FIG. 16 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1849) (such as, for example USB ports of the computer system (1800)); others are commonly integrated into the core of the computer system (1800) by attachment to a system bus as described below (for example Ethernet interface into a PC computer system or cellular network interface into a smartphone computer system). Using any of these networks, computer system (1800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). Architectures for a peripheral bus include PCI, USB, and the like.

CPUs (1841), GPUs (1842), FPGAs (1843), and accelerators (1844) can execute certain instructions that, in combination, can make up the aforementioned computer code. That computer code can be stored in ROM (1845) or RAM (1846). Transitional data can be also be stored in RAM (1846), whereas permanent data can be stored for example, in the internal mass storage (1847). Fast storage and retrieve to any of the memory devices can be enabled through the use of cache memory, that can be closely associated with one or more CPU (1841), GPU (1842), mass storage (1847), ROM (1845), RAM (1846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1800), and specifically the core (1840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1840) that are of non-transitory nature, such as core-internal mass storage (1847) or ROM (1845). The software implementing various embodiments of the present disclosure can be stored in such devices and executed by core (1840). A computer-readable medium can include one or more memory devices or chips, according to particular needs. The software can cause the core (1840) and specifically the processors therein (including CPU, GPU, FPGA, and the like) to execute particular processes or particular parts of particular processes described herein, including defining data structures stored in RAM (1846) and modifying such data structures according to the processes defined by the software. In addition or as an alternative, the computer system can provide functionality as a result of logic hardwired or otherwise embodied in a circuit (for example: accelerator (1844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method of point cloud geometry decoding in a point cloud decoder, comprising:
    receiving, by processing circuitry and from a coded bitstream for a point cloud that includes a set of points in a three-dimensional (3D) space, first signaling information being indicative of partition information of the point cloud;
    determining, by the processing circuitry and from the coded bitstream for the point cloud, second signaling information based on the first signaling information indicating a first value, the second signaling information being indicative of a partition mode of the 3D space;

receiving third signaling information that indicates whether the 3D space is an asymmetric cuboid;

determining dimensions of the 3D space that are signaled along x, y, and z directions based on the third signaling information indicating that the 3D space is the asymmetric cuboid;

partitioning, by the processing circuitry, the 3D space based on the determined dimensions of the 3D space and based on the partition mode of the 3D space indicated by the second signaling information; and reconstructing, by the processing circuitry, the point cloud based on the partitioned 3D space.

2. The method of claim 1, further comprising:
determining the partition mode to be a pre-defined Quad-tree and Binary-tree (QtBt) partition based on the second signaling information indicating a second value.

3. The method of claim 1, further comprising:
receiving 3-bit signaling information for each of a plurality of partition levels in the partition mode based on the second signaling information indicating the first value, the 3-bit signaling information for each of the plurality of partition levels being indicative of partition directions along x, y, and z directions for the respective partition level in the partition mode.

4. The method of claim 3, wherein the 3-bit signaling information is determined based on the dimensions of the 3D space.

5. The method of claim 1, further comprising:
determining the partition mode based on the first signaling information indicating a second value, the partition mode including a respective octree-partition in each of a plurality of partition levels in the partition mode.

6. A method of point cloud geometry decoding in a point cloud decoder, comprising:
receiving, by processing circuitry and from a coded bitstream for a point cloud that includes a set of points in a three-dimensional (3D) space, first signaling information being indicative of partition information of the point cloud;

receiving second signaling information that indicates whether the 3D space is an asymmetric cuboid;

determining dimensions of the 3D space that are signaled along x, y, and z directions based on the second signaling information indicating that the 3D space is the asymmetric cuboid;

partitioning, by the processing circuitry, the 3D space based on the determined dimensions of the 3D space and based on a partition mode of the 3D space indicated by the first signaling information, the partition mode including a plurality of partition levels; and reconstructing, by the processing circuitry, the point cloud based on the partitioned 3D space.

7. The method of claim 6, further comprising:
receiving 3-bit signaling information for each of the plurality of partition levels in the partition mode based on the first signaling information indicating a first value, the 3-bit signaling information for each of the plurality of partition levels being indicative of partition directions along x, y, and z directions for the respective partition level in the partition mode.

8. The method of claim 7, wherein the 3-bit signaling information is determined based on the dimensions of the 3D space.

9. The method of claim 6, further comprising:
determining a partition mode that includes a respective octree-partition in each of the plurality of partition levels as the partition mode based on the first signaling information indicating a second value.

10. The method of claim 9, wherein:
the second signaling information indicating the 3D space is the asymmetric cuboid when the second signaling information is a first value, and the second signaling information indicating the 3D space is a symmetric cuboid when the second signaling information is a second value.

11. The method of claim 10, further comprising:
based on the first signaling information indicating the second value and the second signaling information indicating the first value, determining the partition mode to include a respective octree-partition in each of first partition levels in the plurality of partition levels of the partition mode; and determining a partition type and a partition direction in a last partition level in the plurality of partition levels of the partition mode according to conditions as follows:

| Partition type and direction | Qt along x-y axes | Qt along x-z axes | Qt along y-z axes |
|---|---|---|---|
| Condition | $d_z = 0 < d_x = d_y$ | $d_y = 0 < d_x = d_z$ | $d_x = 0 < d_y = d_z$ |
| Partition type and direction | Bt along x axis | Bt along y axis | Bt along z axis |
| Condition | $d_y = 0 \leq d_z < d_x$ $d_z = 0 \leq d_y < d_x$ | $d_x = 0 \leq d_z < d_y$ $d_z = 0 \leq d_x < d_y$ | $d_x = 0 \leq d_y < d_z$ $d_y = 0 \leq d_x < d_z$, | wherein $d_x$, $d_y$, and $d_z$ are log 2 sizes of the 3D space in the x, y, and z directions, respectively.

12. An apparatus of processing point cloud data, comprising:
processing circuitry configured to:
receive first signaling information from a coded bitstream for a point cloud that includes a set of points in a three-dimensional (3D) space, the first signaling information being indicative of partition information of the point cloud;

receive second signaling information that indicates whether the 3D space is an asymmetric cuboid;

determine dimensions of the 3D space that are signaled along x, y, and z directions based on the second signaling information indicating that the 3D space is the asymmetric cuboid;

partition the 3D space based on the determined dimensions of the 3D space and based on a partition mode of the 3D space indicated by the first signaling information, the partition mode including a plurality of partition levels; and reconstruct the point cloud based on the partitioned 3D space.

13. The apparatus of claim 12, wherein the processing circuitry is further configured to:
receive 3-bit signaling information for each of the plurality of partition levels in the partition mode based on the first signaling information indicating a first value, the 3-bit signaling information for each of the plurality of partition levels being indicative of partition directions along x, y, and z directions for the respective partition level in the partition mode.

14. The apparatus of claim 13, wherein the 3 bit signaling information is determined based on the dimensions of the 3D space.

15. The apparatus of claim 12, wherein the processing circuitry is further configured to:
   determine a partition mode that includes a respective octree-partition in each of the plurality of partition levels as the partition mode based on the first signaling information indicating a second value.

16. The apparatus of claim 15, wherein
   the second signaling information indicating the 3D space is the asymmetric cuboid when the second signaling information is a first value, and the second signaling information indicating the 3D space is a symmetric cuboid when the second signaling information is a second value.

17. The apparatus of claim 16, wherein the processing circuitry is further configured to:
   based on the first signaling information indicating the second value and the second signaling information indicating the first value, determine the partition mode to include a respective octree-partition in each of first partition levels in the plurality of partition levels of the partition mode; and
   determining a partition type and a partition direction in a last partition level in the plurality of partition levels of the partition mode according to conditions as follows:

| Partition type and direction | Qt along x-y axes | Qt along x-z axes | Qt along y-z axes |
|---|---|---|---|
| Condition | $d_z = 0 < d_x = d_y$ | $d_y = 0 < d_x = d_z$ | $d_x = 0 < d_y = d_z$ |
| Partition type and direction | Bt along x axis | Bt along y axis | Bt along z axis |
| Condition | $d_y = 0 \leq d_z < d_x$ $d_z = 0 \leq d_y < d_x$ | $d_x = 0 \leq d_z < d_y$ $d_z = 0 \leq d_x < d_y$ | $d_x = 0 \leq d_y < d_z$ $d_y = 0 \leq d_x < d_z$, | wherein $d_x$, $d_y$, and $d_z$ are log 2 sizes of the 3D space in the x, y, and z directions, respectively.

* * * * *